US007168043B2

(12) United States Patent
Shimizu et al.

(10) Patent No.: US 7,168,043 B2
(45) Date of Patent: Jan. 23, 2007

(54) APPARATUS AND SYSTEM FOR COMMUNICATION

(75) Inventors: Atsushi Shimizu, Yokohama (JP); Kenichi Yoshida, Kitamoto (JP); Takashi Nisikado, Ebina (JP); Fumio Noda, Kodaira (JP); Osamu Takada, Kamakura (JP)

(73) Assignee: Hitachi, Ltd., Tokyo (JP)

( * ) Notice: Subject to any disclaimer, the term of this patent is extended or adjusted under 35 U.S.C. 154(b) by 611 days.

(21) Appl. No.: 10/230,102

(22) Filed: Aug. 29, 2002

(65) Prior Publication Data

US 2003/0191798 A1   Oct. 9, 2003

(30) Foreign Application Priority Data

Apr. 8, 2002   (JP) ............................. 2002-104657

(51) Int. Cl.
*G06F 17/00* (2006.01)
*G06F 15/16* (2006.01)

(52) U.S. Cl. ....................... 715/734; 715/744; 715/740; 715/736; 715/735; 709/200; 709/203; 709/223; 709/227

(58) Field of Classification Search ........ 715/733–744, 715/711, 760; 709/200, 203, 223, 227, 230, 709/238, 245–250
See application file for complete search history.

(56) References Cited

U.S. PATENT DOCUMENTS

| | | | | |
|---|---|---|---|---|
| 5,805,803 A | * | 9/1998 | Birrell et al. ................ | 726/12 |
| 5,861,883 A | * | 1/1999 | Cuomo et al. ............... | 715/733 |
| 5,935,207 A | * | 8/1999 | Logue et al. ................ | 709/219 |
| 6,253,248 B1 | * | 6/2001 | Nakai et al. ................ | 709/237 |
| 6,272,531 B1 | * | 8/2001 | Shrader ....................... | 709/206 |
| 6,345,507 B1 | * | 2/2002 | Gillen ......................... | 62/3.7 |
| 6,408,336 B1 | * | 6/2002 | Schneider et al. .......... | 709/229 |
| 6,499,036 B1 | * | 12/2002 | Gurevich ................. | 707/103 R |
| 6,775,687 B1 | * | 8/2004 | Binding et al. ............. | 709/203 |

(Continued)

FOREIGN PATENT DOCUMENTS

EP            0963076            12/1999

(Continued)

OTHER PUBLICATIONS

"Hypertext Transport Protocol HTTP/1.1", by R. Fielding et al, RFC 2068, UC Irvine, Digital Equipment Corp., M.I.T., Jan. 1997, pp. 11-13.

(Continued)

*Primary Examiner*—Tadesse Hailu
(74) *Attorney, Agent, or Firm*—Mattingly, Stanger, Malur & Brundidge, P.C.

(57) ABSTRACT

In communication between communication terminals utilizing a network, a communication apparatus that receives and interprets service contents information described by a tag-type language or the like and performs processing in accordance with the interpretation thereof is disposed between the communication terminals. The communication apparatus can combine a plurality of processing operations in accordance with the described contents of the information to be implemented and can make various service designs. Further, the communication apparatus is characterized to acquire a program for updating a processing method definition connecting the service contents information and the processing operations by means of the Internet so that the processing method definition of the apparatuses distributed dispersedly can be modified promptly and the whole system can cope with modification of service contents promptly.

13 Claims, 22 Drawing Sheets

U.S. PATENT DOCUMENTS

| | | | |
|---|---|---|---|
| 6,842,906 B1 * | 1/2005 | Bowman-Amuah | 719/330 |
| 2002/0069241 A1 * | 6/2002 | Narlikar et al. | 709/203 |
| 2002/0178381 A1 * | 11/2002 | Lee et al. | 713/201 |

FOREIGN PATENT DOCUMENTS

| | | | |
|---|---|---|---|
| JP | 2002-228672 | * | 8/2000 |
| WO | WO-A1-00046679 | | 8/2000 |
| WO | 01/01300 | | 1/2001 |

OTHER PUBLICATIONS

"An Architecture for Differentiated Services", by S. Blake et al, RFC 2475, Dec. 1998.

* cited by examiner

FIG.8A

```
<?xml version="1.0"?>
 <modify processing method definition>
    <parameter "location of processing unit to be replaced" value>
 <?modify processing method definition>
 ...
```

FIG.8B

```
<?xml version="1.0"?>
<section "name of updating program" "class name"
      "kind of operation [replacement/implementation etc.]">
      <designation of place for preserving this program in
         communication apparatus "place">
      <updating program>
        what encodes updating program
      </updating program>
      <other parameter>
      <other parameter>
        ...
</section>
```

APPARATUS AND SYSTEM FOR COMMUNICATION

CROSS-REFERENCE TO RELATED APPLICATIONS

The present application relates to subject matters described in co-pending applications Ser. No. 09/931,254 filed on Aug. 17, 2001 and Ser. No. 09/890,826 filed on Jan. 27, 2000 and assigned to the assignee of the present application. The disclosures of these applications are incorporated herein by reference.

BACKGROUND OF THE INVENTION

The present invention relates to processing of received information performed in a communication apparatus provided in a communication path between client terminals and server terminals.

The Internet is utilized to access from a client terminal to a server terminal, so that various services are becoming available. However, when client terminals request services to server terminals directly, the requests from the client terminals are concentrated in a specific server terminal, so that the capacity of communication lines or processing capability of the server terminal that processes the requests is not enough to cope with the requests and it takes a considerable time for the client terminals to receive and enjoy the services. As a countermeasure against this problem, there is a communication method using a proxy apparatus.

The communication method between server terminals and client terminals through the proxy apparatus is described in article 1: "Hypertext Transport Protocol HTTP/1.1", by Fielding, R., Gettys, J., Mogul, J., Frystyk, H., and Berners-Lee, T., RFC 2068, UC Irvine, Digital Equipment Corporation, M.I.T., pp. 11–13, January, 1997.

Recently, the communication proxy apparatus is further requested to have function that can set up thoughtful service contents in accordance with user's attributes and function that can manage user's information such as user's accounting information.

The technique having the purpose of adding the function to the communication proxy apparatus is described in article 2: International Publication No. WO-A1-00046679, for example.

The article 2 discloses that character-string information described by a tag-type language is added to data to be transmitted and received between the communication proxy apparatuses and the communication proxy apparatuses are controlled in accordance with kind of the character-string information. Further, processing utilizing the character-string information to be transmitted to the communication proxy apparatus from a client terminal is not performed.

In other words, in the technique disclosed in the article 2, there is room for improvement in the respect that the communication proxy apparatus effectively utilizes various kinds of information possessed by the server-side terminal and the client-side terminal.

Further, in order to cope with modification of various kinds of character-string information transmitted from the server-side terminal and the client-side terminal, although it is necessary to efficiently set up a processing unit that performs processing in accordance with character-string information to be transmitted in the communication proxy apparatus, the article 2 does not disclose the setting-up method in detail.

Accordingly, the communication proxy apparatus further improved is desired.

SUMMARY OF THE INVENTION

The present invention is to provide a communication proxy apparatus having the function that can set up thoughtful service contents in accordance with user's attributes and the function that can manage user's information.

According to the present invention, the communication proxy apparatus comprises an advanced processing unit that performs processing in accordance with the character-string information to thereby (a) provide the technique that provide a new service promptly and the technique that can rapidly cope with modification of service contents with respect to services using exchange of information between communication terminals by means of a network.

Further, according to the present invention, the communication proxy apparatus comprises processing units that perform setting-up of a communication apparatus relating to communication performance important to cope with thoughtful service contents, processing of a database for registering or referring to user's information and distribution processing of accesses to an optimum server-side terminal of a plurality of server-side terminals and combines them to provide usable techniques.

According to the present invention, a contents delivery enterpriser possessing a server-side terminal not only can describe various kinds of information concerning contents in the contents or another file and can add the information to data such as contents to be transmitted but also can transmit the information to the communication proxy apparatus prior to transmission of data to thereby be reflected to a database, servers and various kinds of communication equipment. For example, in case of streaming deliver of contents, quality, usage, price and the like of information are transmitted.

In other words, character-string information transmitted prior to data transmitted from the server-side terminal to the communication proxy apparatus is utilized to perform processing.

Further, according to the present invention, information transmitted from the server-side terminal or the client-side terminal is utilized to realize the following:

(b) provision of an accessing unit that makes reference and registration of information to various database systems such as an accounting system in order to facilitate cooperation with the database system required to perform various services, (c) construction of a system that easily and individually copes with a request to network resources varied depending on services such as service requiring securement of a broad band as delivery of multimedia contents and service requiring assurance of the reliability of the communication line, and (d) provision of a communication terminal or a communication apparatus having the function of confirming information being transmitted so as to make it possible to construct a system respecting consciousness for privacy protection of customers and enterprisers in the above case.

The method of realizing the above item (a) is as follows: The communication apparatus of the present invention stores a processing method definition for processing the character-string information described by means of the tag-type language received from the server-side communication terminal or the client-side communication terminal. Further, a processing method definition updating program received through the communication line can update the processing method definition in accordance with modification of service contents to thereby cope with the modification of service contents promptly and flexibly.

The process until the program is received through the communication line and the processing method definition is updated is described below. As the method of issuing a command to the communication apparatus to acquire the processing method definition from the delivery server, there are the following methods:

(i) a method of transferring from a management communication terminal to the communication apparatus, character-string information described by the tag-type language, of the command of acquiring the processing method definition updating program from the delivery server, and (ii) a method of transmitting from the server-side terminal to the communication apparatus, the character-string information described by the tag-type language at the same time as or prior to delivery of contents when the contents are delivered.

Various processing units such as a transmission information preparing unit, a transmission information confirming unit, the input information interpreting unit and the processing implementation unit are also updated by means of the methods described in the above items (i) and (ii). Further, the processing unit being operated in the communication apparatus is modified without stopping the communication apparatus and the processing unit being operated.

In order to realize the above item (b), in the communication apparatus of the present invention, the input information interpreting unit receives and interprets the character-string information described by the tag-type language and when a command for performing database access is recognized, the processing implementation unit implements the command.

In order to realize the above item (c), in the communication apparatus of the present invention, the input information interpreting unit receives and interprets the character-string information described by the tag-type language and when a command such as assurance of band width and control of route for controlling network resources is recognized, the processing implementation unit transmits information for performing control to network equipment such as router and switch.

In order to realize the above item (d), in the communication apparatus of the present invention, the client-side terminal or the server-side terminal includes a processing unit and the transmission information confirming unit for confirming contents of the character-string information to be transmitted to the communication apparatus of the present invention. The communication apparatus of the present invention comprises a redirected destination designating unit, a network apparatus control unit and a database access unit and can combine these units to provide various service contents.

Other objects, features and advantages of the invention will become apparent from the following description of the embodiments of the invention taken in conjunction with the accompanying drawings.

BRIEF DESCRIPTION OF THE DRAWINGS

FIGS. 8A and 8B are diagrams showing examples of character-string information transmitted from the managing communication terminal or the server-side terminal for modifying the processing units in the communication apparatus 11 and the processing method definition;

DESCRIPTION OF THE EMBODIMENTS

Figure 1:
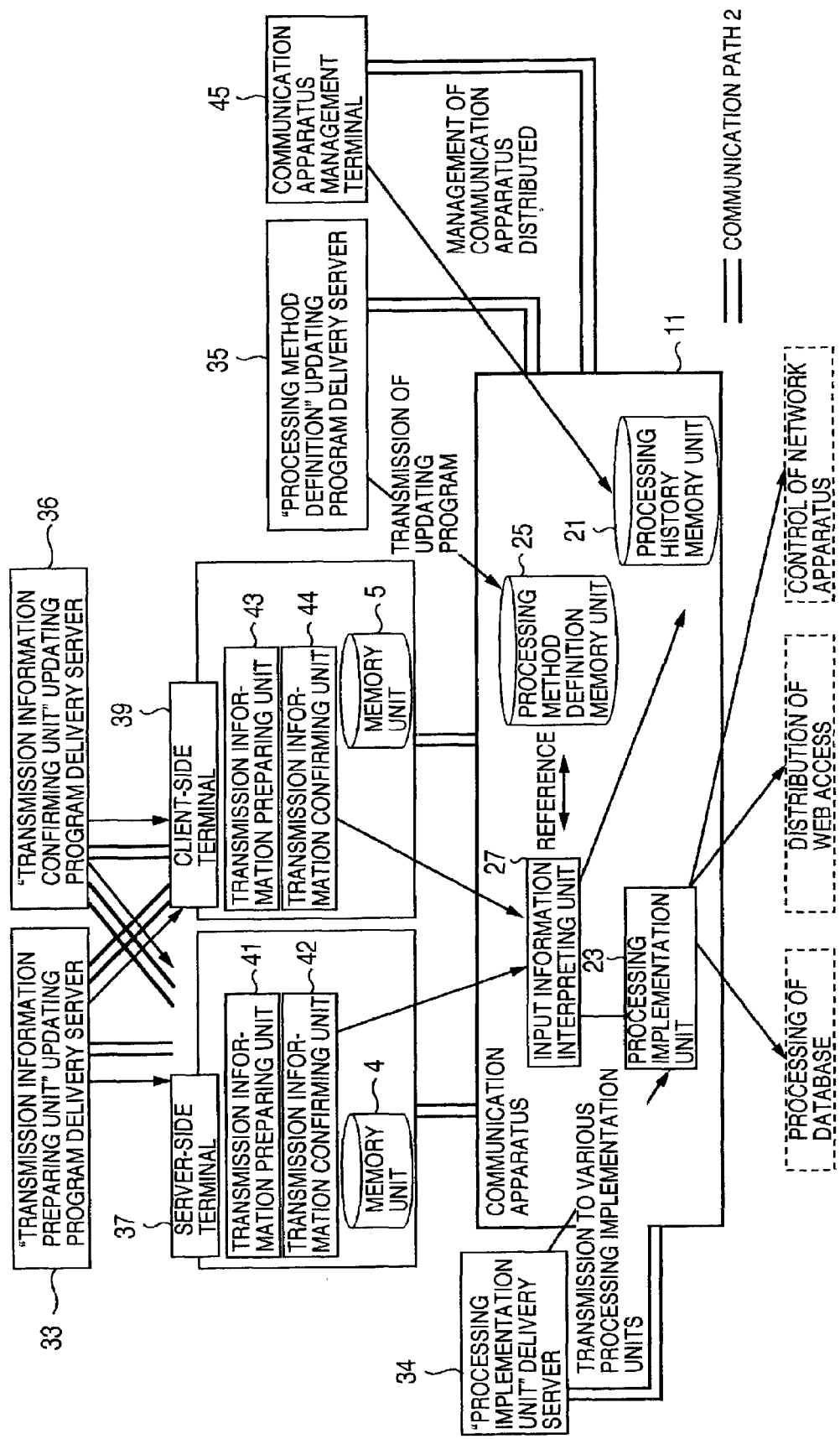
FIG. 1 is a block diagram schematically illustrating an example of a configuration utilizing a communication apparatus according an embodiment of the present invention.
Figure 2:
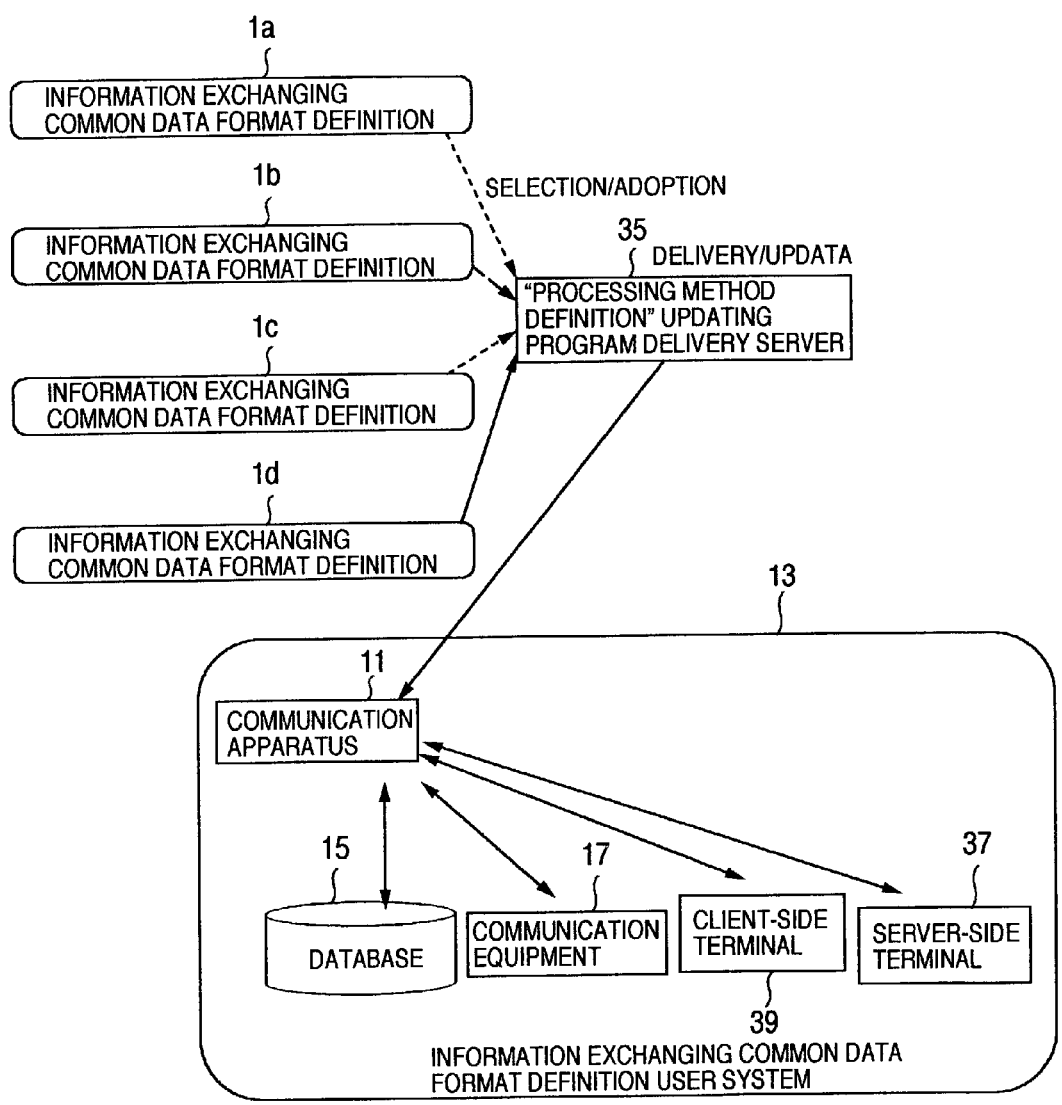
FIG. 2 is a concept diagram illustrating a method of selecting a certain information exchanging data format from a plurality of existing information exchanging common data formats and utilizing it.

Referring now to FIGS. 1 and 2, a basic configuration of an embodiment is described.

(Basic Configuration)

FIG. 1 is a block diagram schematically illustrating a logical configuration of a network system according to a communication apparatus of the embodiment. A server-side communication terminal or its system (hereinafter referred to server-side terminal) 37 and a client-side communication terminal or its system (hereinafter referred to client-side terminal) 39 are connected to each other through various network apparatuses such as router apparatuses and a communication proxy apparatus (hereinafter referred to communication apparatus) 11 by means of a communication path 2. The communication path 2 constitutes a logical communication route for transmitting and receiving data between apparatuses connected through the communication path 2. One communication path 2 may be realized by a plurality of physical communication lines through one or more router apparatuses or conversely a plurality of different communication paths 2 may be realized by one physical communication line.

The server-side terminal 37, the client-side terminal 39 and the communication apparatus 11 are connected to a transmission information preparing unit updating program delivery server apparatus 33, a transmission information confirming unit updating program delivery server apparatus 36, a processing method definition updating program delivery server apparatus 35 and a communication apparatus management terminal 45.

The communication apparatus 11 comprises an input information interpreting unit 27, a processing implementation unit 23, a processing method definition memory unit 25 and a processing history memory unit 21.

The server-side terminal 37 includes a transmission information preparing unit 41 and a transmission information confirming unit 42 and the client-side terminal 39 includes a transmission information preparing unit 43 and a transmission information confirming unit 44. Both of the server-side terminal 37 and the client-side terminal 39 include memory unit 4 and 5, respectively, and the memory units 4 and 5 store one or more information data, attribute information of the information data and other information.

The communication apparatus 11 may includes the transmission information preparing units 41, 43 and the transmission information confirming unit 42, 44 instead of the server-side terminal 37 and the client-side terminal 39. Further, a plurality of communication apparatuses 11 may be included in the network system.

Figure 21:
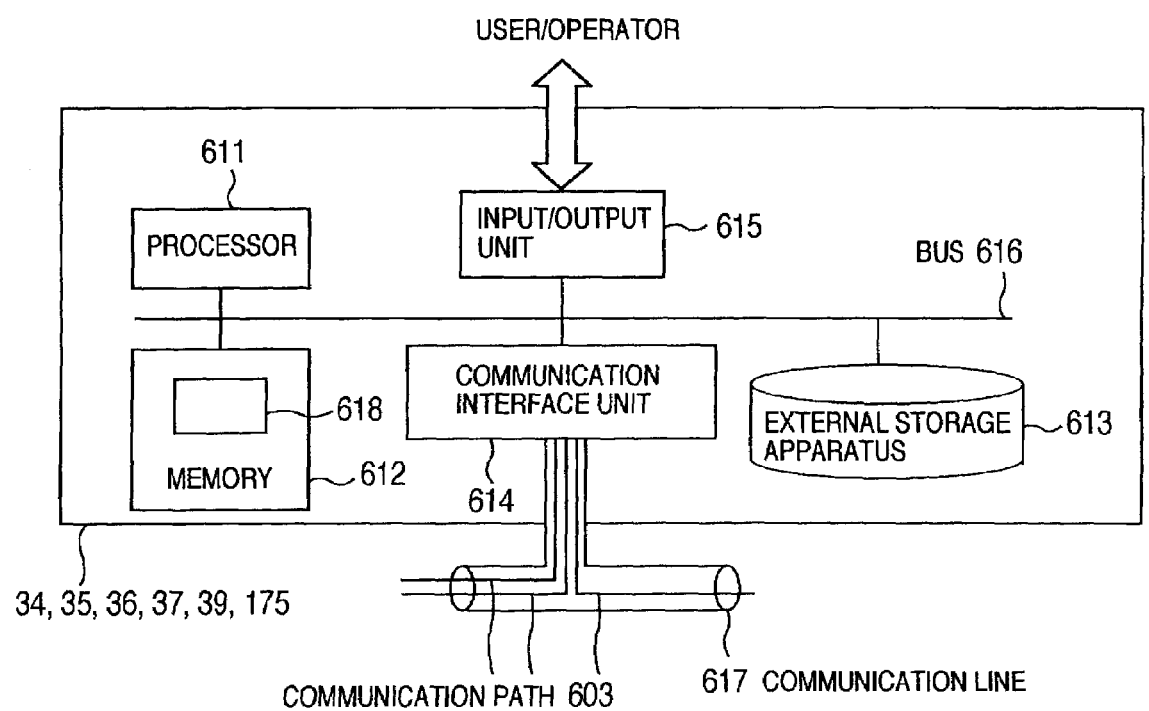
FIG. 21 is a diagram illustrating an physical configuration of each apparatus of the embodiment.

FIG. 21 schematically illustrates a physical configuration example of each apparatus which can be realized in a general information processing apparatus, such as the communication apparatus 11, the transmission information preparing unit updating program delivery server 33, the processing implementation unit delivery server 34, the processing method definition updating program delivery server 35, the transmission information confirming unit updating program delivery server 36, the server-side terminal 37, the client-side server 39, the communication apparatus management terminal 45 and a cache server 175 described later.

More particularly, the apparatus shown in FIG. 21 includes a processor 611 for implementing an information processing program 618, a memory 612 for storing the information processing program 618 being implemented by the processor 611 and various data directly referred by the processor 611, an external storage apparatus 613 for storing a large number of information processing programs 618 and various data in the non-volatile form, a communication interface unit 614 connected to communication lines 617 to transmit and receive data from other information processing apparatuses and communication apparatuses, and an input/output unit 615 for performing input/output operation with the operator, which are connected to one another through a communication line (hereinafter referred to as bus) 616 such as a bus for transmitting and receiving data, instructions and notification of data arrival.

The information processing program 618 implemented by the processor 611 preserves procedure information for realizing the above-mentioned apparatuses to thereby communicate with the user or the operator through the input/output unit 615 if necessary, instruct the external storage apparatus 613 to perform exchange of data between the external storage apparatus 613 and the memory 612 while complying with instructions from the user or the operator, receive data arrival notification from the communication interface unit 614 to write the data that has arrived in the memory 612 and instruct the communication interface unit 614 to transmit data in the memory 612 to another information processing apparatus.

In the embodiment of FIG. 1, the memory unit 4 in the server-side terminal/system, the memory unit 5 in the client-side terminal/system, the processing history memory unit 21 and the processing method definition memory unit 25 are realized as a part of the external storage apparatus 613 or the memory 612. The processing method definition and the processing history are stored in the external storage apparatus 613 or the memory 612 to be managed.

The transmission information preparing units (41, 43), the transmission information confirming units (42, 44), the input information interpreting unit 27, the processing implementation unit 23 and the like shown in FIG. 1 may be realized as specific hardware but are realized by the processing procedure described in the information processing program 618 in the embodiment using the general information processing apparatus of FIG. 21. Various functions of other apparatuses and units such as the communication apparatus 11, the transmission information preparing unit updating program delivery server 33, the processing implementation unit delivery server 34, the processing method definition updating program delivery server 35, the transmission information confirming unit updating program delivery server 36, the server-side terminal 37, the client-side terminal 39, the communication apparatus management terminal 45 and the cache server 175 described later are realized by the processing procedure described in the information processing program 618.

The above-mentioned information processing programs 618 are previously stored in the memory 612 or the external storage apparatus 613 or are stored from other apparatus by means of a portable memory medium or a communication medium.

The plurality of communication apparatuses 11 distributed dispersedly in the network implement the program received from the processing method definition updating program delivery server 35 to thereby update the processing method definition in order to promptly arrange the processing rule of the character-string information transmitted from the client-side terminal 39, the server-side terminal 37 or the communication apparatus 11. The plurality of communication apparatuses 11 can load the common processing method definition by means of this method. Particularly, this method is effective for the case where an enterprise utilizes the plurality of communication apparatuses 11 to provide services.

As shown in FIG. 2, the enterprise for providing services selects or prepares a proper information exchanging common data format 1 from a plurality of candidates thereof and delivers the processing method definition updating program in accordance with the definition thereof.

A user system 13 of the information exchanging common data format includes, as its constituent elements, the communication apparatus 11, a database 15 for preserving information and other information required when operation is performed in accordance with the service definition delivered by the communication apparatus 11, a communication equipment 17 such as router to which the quality of service (QoS) can be set up, the client-side terminal 39 and the server-side terminal 37.

(Format of Data to Be Transmitted and Received)

An example of description by the tag-type language prepared by the transmission information preparation units 41 and 43 is given as follows.

<processing identification>parameter</processing identification>

The tag-type language includes, for example, XML. A service contents definition document described by the XML or the tag-type language similar to the XML and transmitted and received between the communication apparatuses of the embodiment or other terminals is named character-string information.

The portion enclosed by "<" and ">" represents the attribute (classification of information) of the parameter enclosed by <processing identification> and </processing identification>.

The input information interpreting unit 27 of the communication apparatus 11 performs processing of the character-string information received from the server-side terminal 37 or the client-side terminal 39 or another communication apparatus 11. The input information interpreting unit 27 refers to the processing method definition stored in the processing method definition memory unit 25 of the communication apparatus 11 and when description for implementing the processing unit corresponding to <processing identification> is found, the input information interpreting unit 27 implements the processing unit. The implementation flow of each processing unit is described later.

<processing identification> can be described in the nested structure as follows:

```
<processing identification 1>
    <processing identification 2>
        parameter
    </processing identification 2>
    <processing identification 3>
        parameter
    </processing identification 3>
</processing identification 1>
```

Further, a plurality of parameters can be described between <processing identification> and </processing identification> as follows:

Moreover, parameters can be inserted between "<" and ">" of <processing identification> as follows:

```
<processing identification
        value
/>
```

The server-side terminal 37, the client-side terminal 39 or the communication apparatus 11 can use the transmission information preparing unit (41, 43, 29) to prepare the character-string information to be transmitted to the communication apparatus 11 by means of the tag-type language as described above.

Further, the client-side terminal 39 can preserve the character-string information transmitted from the server-side terminal 37 in the client-side terminal 39 as a text file used when the information is transmitted to the server. Moreover, the text file can utilize at the time of next transmission of information to the communication apparatus 11.

(Transmission Information Preparing Unit)

Figure 3:
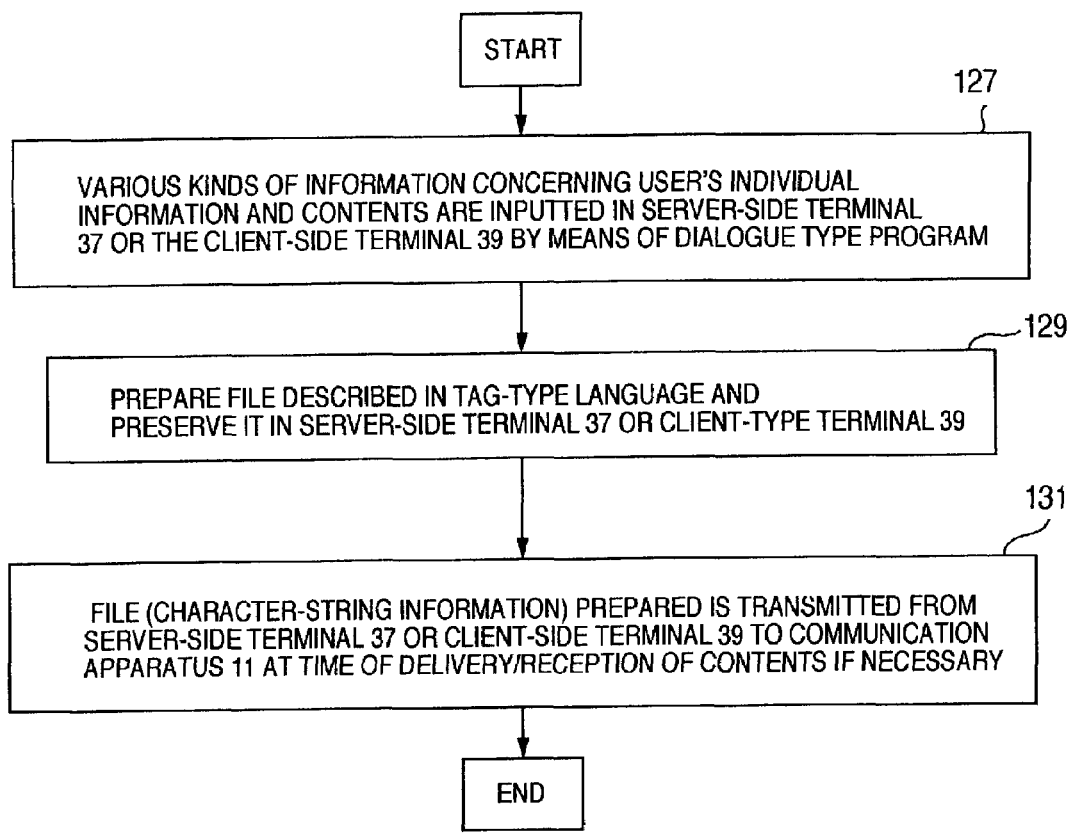
FIG. 3 is a flow chart showing the preparation process of transmission information utilizing the tag-type language.

The information to be transmitted to the communication apparatus 11 is prepared by the method shown in the flow chart of FIG. 3.

Various kinds of information concerning user's individual information and contents is inputted in the server-side terminal 37 or the client-side terminal 39 by means of a dialogue type program (127).

Next, the file of character-string information produced by operation in step 127 is preserved (129).

The prepared file (the character-string information) is next transmitted to the communication apparatus 11 at the time of delivery or reception of contents if necessary (131).

Instead of the operation in steps 127 and 129, the dialogue type program such as the Form may be used on the WWW (World Wide Web) server to input the various kinds of information and the file (character-string information) produced on the WWW server as a result may be received by the client-side terminal 39 or the server-side terminal 37 or the communication apparatus 11 to be preserved each.

(Transmission Information Confirming Unit)

Figure 4:
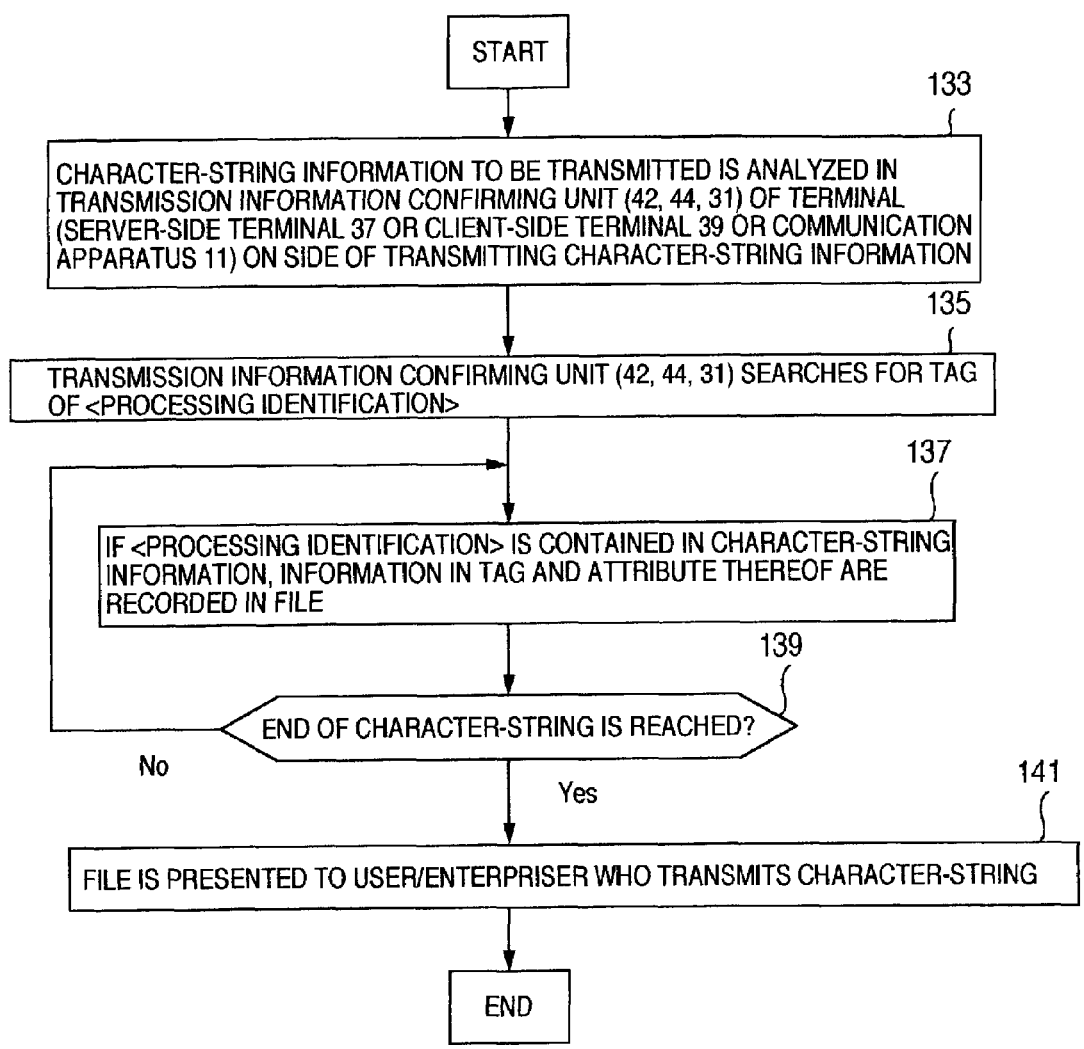
FIG. 4 is a flow chart showing the process that the information transmitting person confirms the character string described by means of the tag-type language.

FIG. 4 is a flow chart for confirming contents of the character-string information to be transmitted or that has been transmitted by the information transmitting person when the character-string information is transmitted to the communication apparatus 11.

First, the character-string information to be transmitted to the communication apparatus 11 is analyzed in the transmission information confirming unit (42, 44, 31) of the server-side terminal 37 or the client-side terminal 39 or the communication apparatus 11 (133).

Next, the transmission information confirming unit (42, 44, 31) searches for the tag of <processing identification> (135). If <processing identification> is contained in the character-string information, information in the tag and the attribute thereof are recorded in the file (137). When it is detected that the end of the character-string information received is reached (139), the file prepared in step 137 and the like is presented to the user or the enterpriser who transmits the character-string information by means of the display unit or the like (141).

(Input Information Interpreting Unit)

Figure 5:
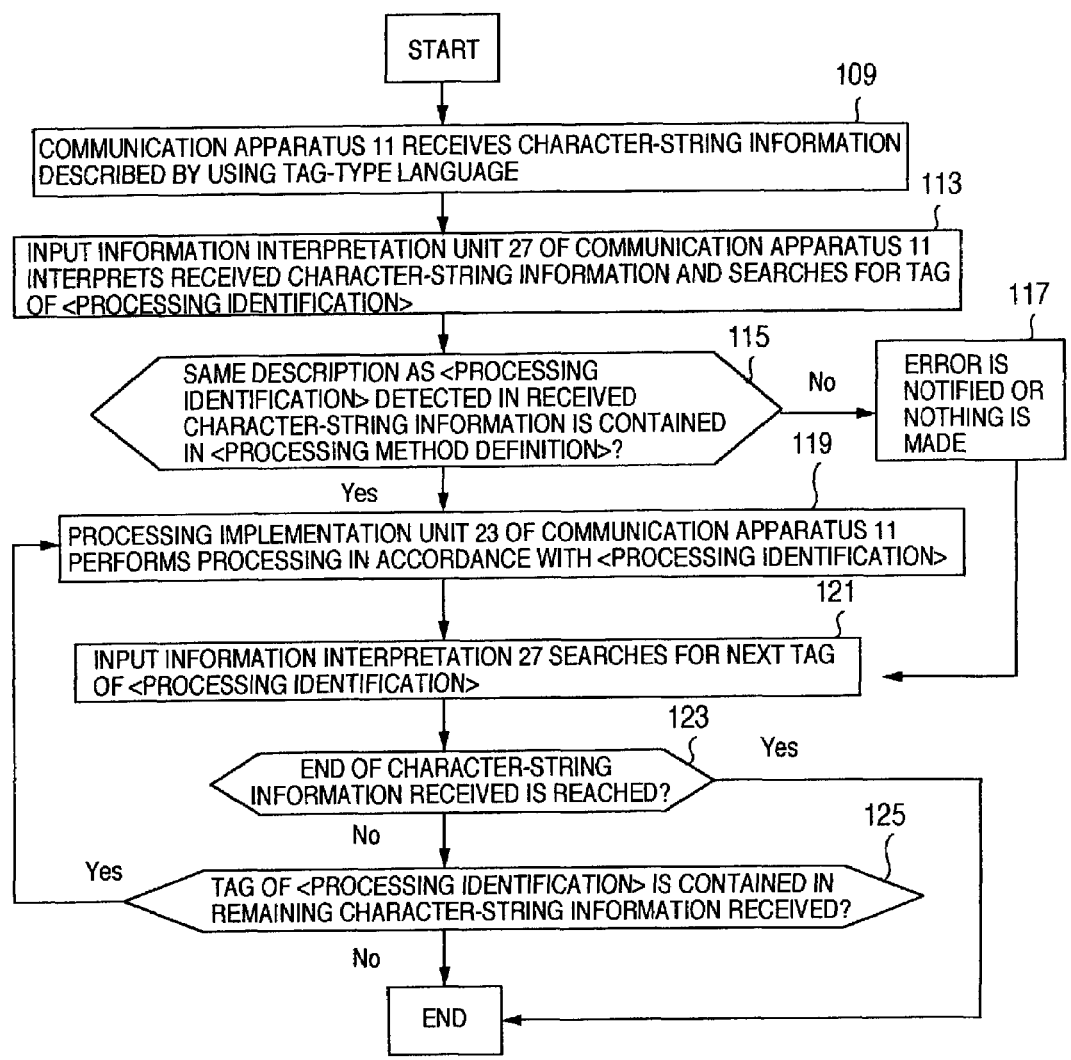
FIG. 5 is a flow chart showing the process for processing the document described by means of the tag-type language in the input information interpreting unit of the communication apparatus of the embodiment.

FIG. 5 shows an example of operation of the input information interpreting unit 27 of the communication unit 11.

The character-string information is received (step 109).

The input information interpreting unit 27 performs interpretation of the character-string information received, that is, search for the tag of <processing identification> (113).

Next, it is examined whether the same character-string as described between "<" and ">" of the tag of <processing identification> detected in the received character-string information is contained in the processing method definition or not (115).

When it is contained, the processing implementation unit 23 performs the processing in accordance with <processing identification> (119). More particularly, processing units such as an access request deputizing unit 143, a redirected destination designating unit 145, a database access unit 147 and a network apparatus control unit 149 are called out to perform the processing. Implementation flow of each processing unit is described later. When it is not contained, an error is notified or nothing is made (117).

Next, the input information interpreting unit 27 searches for the next tag of <processing identification> (121). When the end of the character-string information received is reached, the operation is ended (123). When the end of the character-string information received is not reached, it is examined whether the tag of <processing identification> is contained in the remaining character-string information received or not and when it is contained, the operation from step 119 is repeated. When it is not contained, the operation is ended (125).

Figure 6:
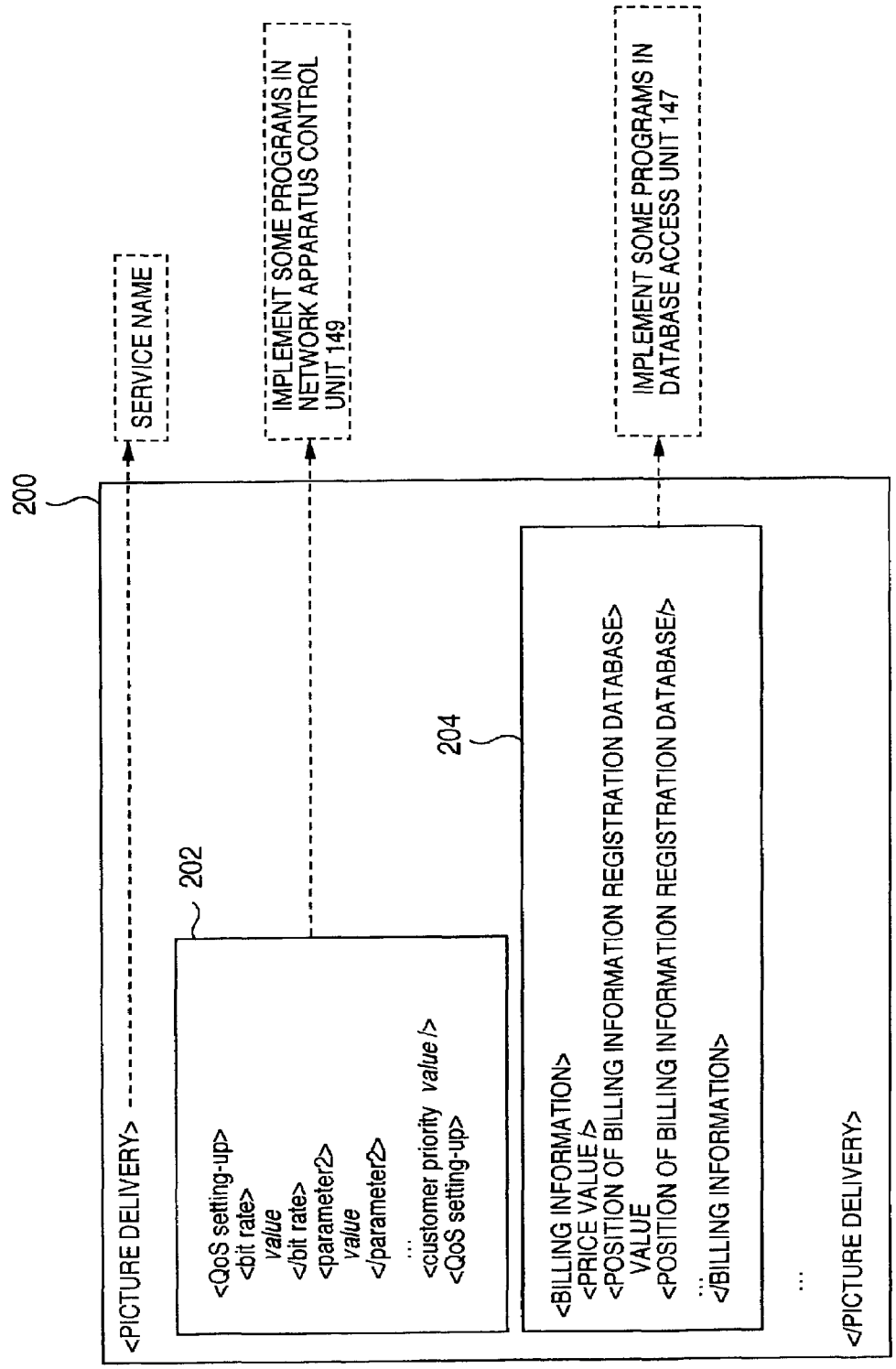
FIG. 6 is a diagram showing an example of the file (character-string information) describing the service contents processed in the input information interpreting unit.

FIG. 6 shows an example of character-string information transmitted to the communication apparatus 11 when the server-side terminal 37 performs the pictures and/or videos delivery service to the client-side terminal 39. The service name is described in first and last lines in 200.

The communication apparatus 11 includes the database access unit for performing operation to the database 15 for registration of accounting information and when the tag of <price> in <billing information> (204) is detected in the character-string information received, the communication apparatus 11 starts the database access unit in order to update the contents utilization history in the database 15. At this time, the database access unit may be started so that parameters within the tag are reflected.

Further, when the tag of <QoS setting-up> as shown by 202, for example, is detected, the network apparatus control unit 149 performs necessary processing in order to ensure the communication quality satisfying the request described in the tag of <QoS setting-up>. As described above, the processing items corresponding to the service contents are described in the form of the above-mentioned character-string information.

When the service contents are modified, the processing method definition in the communication apparatus 11 and the processing implementation unit 23 (program and the like) can be changed to thereby cope with the modified service contents promptly.

(Method of Modifying Processing Unit Being Operated in Communication Apparatus)

Figure 7:
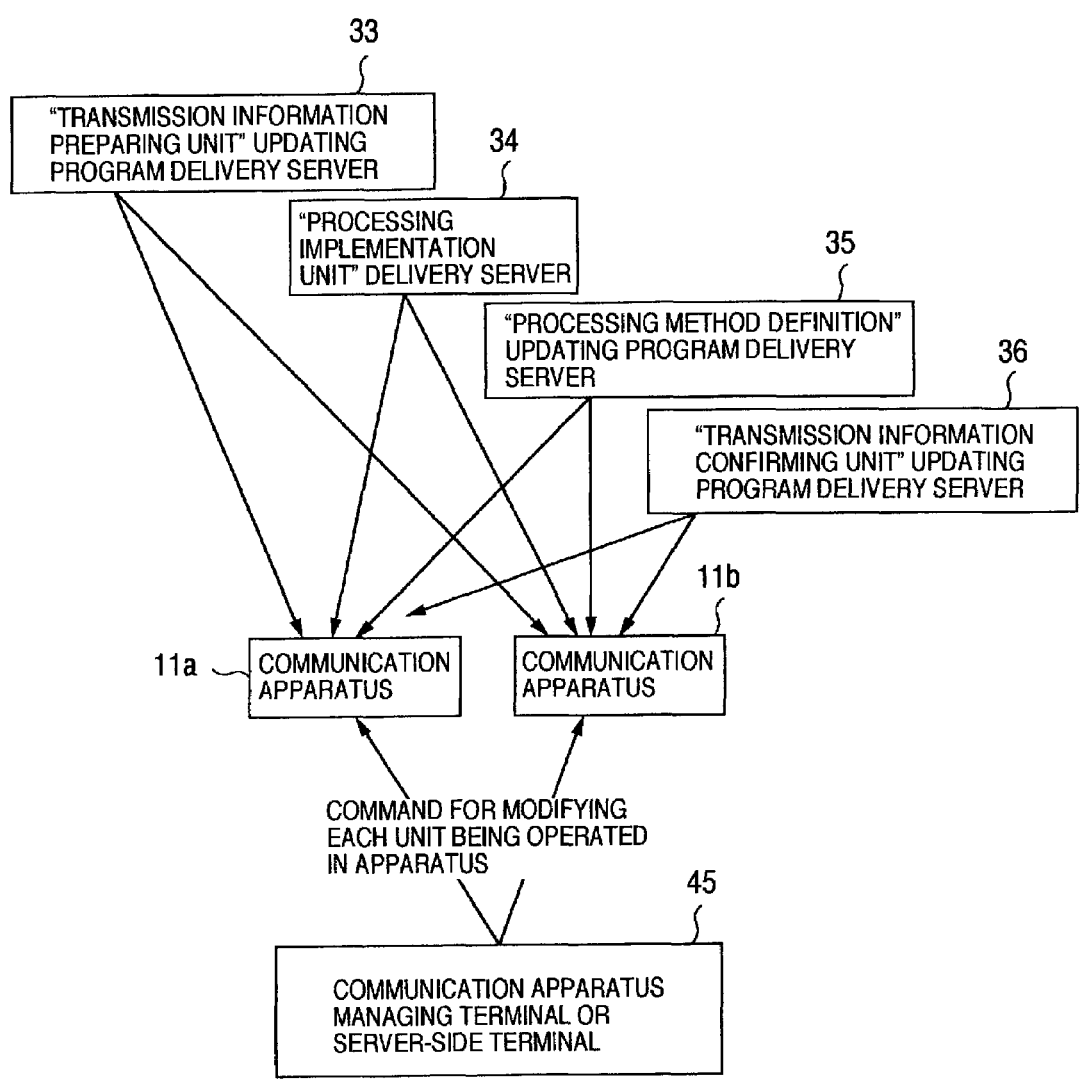
FIG. 7 is a diagram illustrating a configuration for modifying the various processing units in the communication apparatus and the processing method definition of the embodiment by transmitting the modification command from the managing communication terminal or the server-side terminal.

FIG. 7 is a diagram illustrating the method of modifying the input information interpreting unit 27, the processing implementation unit 23, the transmission information preparing unit 29, the transmission information confirming unit 31 being operated in the communication apparatus or the processing method definition recorded in the processing method definition memory unit 25.

The communication apparatus 11 receives the program for "modifying the processing unit being operated" or for "updating and adding the processing method definition" from the server such as the transmission information preparing unit updating program delivery server 33, the processing implementation unit delivery server 34, the processing method definition updating program delivery server 35 and the transmission information confirming unit updating program delivery server 36 and utilizes the program to modify the processing method definition preserved in the processing units or the processing method definition memory unit 25.

Transmission of the command for performing the update to the communication apparatus 11 is made by transmitting the character-string information from the external terminal such as another communication apparatus 11. The processing unit (program and the like) for managing the processing method definition updating program and the processing units such as the access request deputizing unit 143, the redirected destination designating unit 145, the database access unit 147 and the network apparatus control unit 149 is operated in the processing implementation unit 23 of the communication apparatus 11 and performs management of reception and interpretation of the character-string information and start, stop and waiting of each processing unit.

By using to this method, difference in the processing method definition among a plurality of dispersedly distributed communication apparatuses 11 or between the communication apparatus 11 and the client-side communication terminal 39 or the server-side communication terminal 37 can be eliminated promptly.

Further, as shown in FIG. 7, the operator may transmit the command for modifying various processing units such as the transmission information preparing unit 29, the processing implementation unit 34 and the transmission information confirming unit 31 or the command for updating and adding the processing method definition, more particularly the character-string information, to the communication apparatus 11 from the communication apparatus managing terminal 45 or the serve-side terminal 37.

FIGS. 8A and 8B show examples of the character-string information to be transmitted. In FIG. 8A, the character-string for modification of the processing method definition is described as a definite example of <processing identification>. The communication apparatus 11 receives the command and acquires the character-string information from the processing method definition updating program delivery server 35 indicated by the parameter "location of processing unit to be replaced" in the command through the communication path. An example of this file is shown in FIG. 8B. This file contains the updating program and the updating program is implemented in the communication apparatus 11 to thereby update and add the various processing units and the processing method definition.

Figure 9:
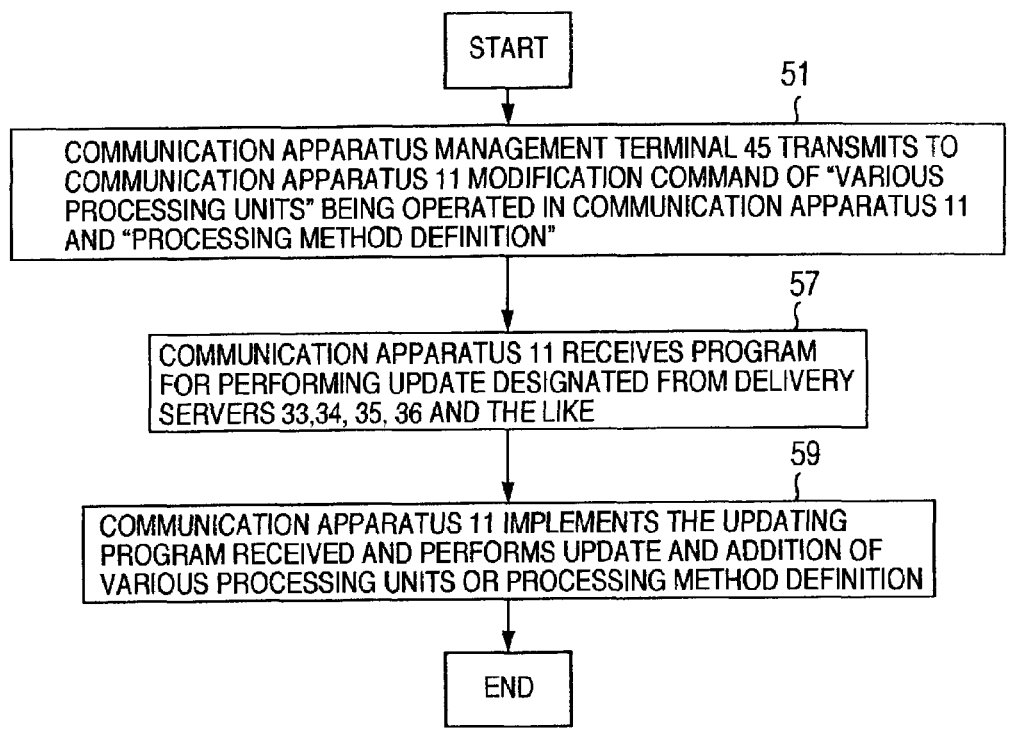
FIG. 9 is a flow chart showing operation for modifying the processing units in the communication apparatus and the processing method definition of the embodiment in response to the modification command from the managing communication terminal.

FIG. 9 is a flow chart showing the processing process. First, the communication apparatus management terminal 45 transmits to the communication apparatus 11 the update and addition command of various processing units being operated in the communication apparatus 11 and the processing method definition (character-string information exemplified in FIGS. 8A and 8B) (51).

Next, the communication apparatus 11 receives the program for performing update and addition designated from the delivery servers 33, 34, 35, 36 and the like (57).

The communication apparatus 11 implements the updating program received and performs update and addition of the various processing units or the processing method definition (59).

The two files shown in FIGS. 8A and 8B are not necessarily required to be divided and the file containing contents described in the two files can be transmitted to the communication apparatus 11 from the operator side.

Further, when the server-side terminal 37 delivers the contents to the client-side terminal 39, the command for modifying the various processing units being operated in the communication apparatus 11 or the processing method definition shown in FIGS. 8A and 8B may be contained in the character string including the processing identification and the parameters described by the tag-type language and delivered before or at the same time as transmission of the contents.

(Details of Processing Implementation Unit)

Figure 22:
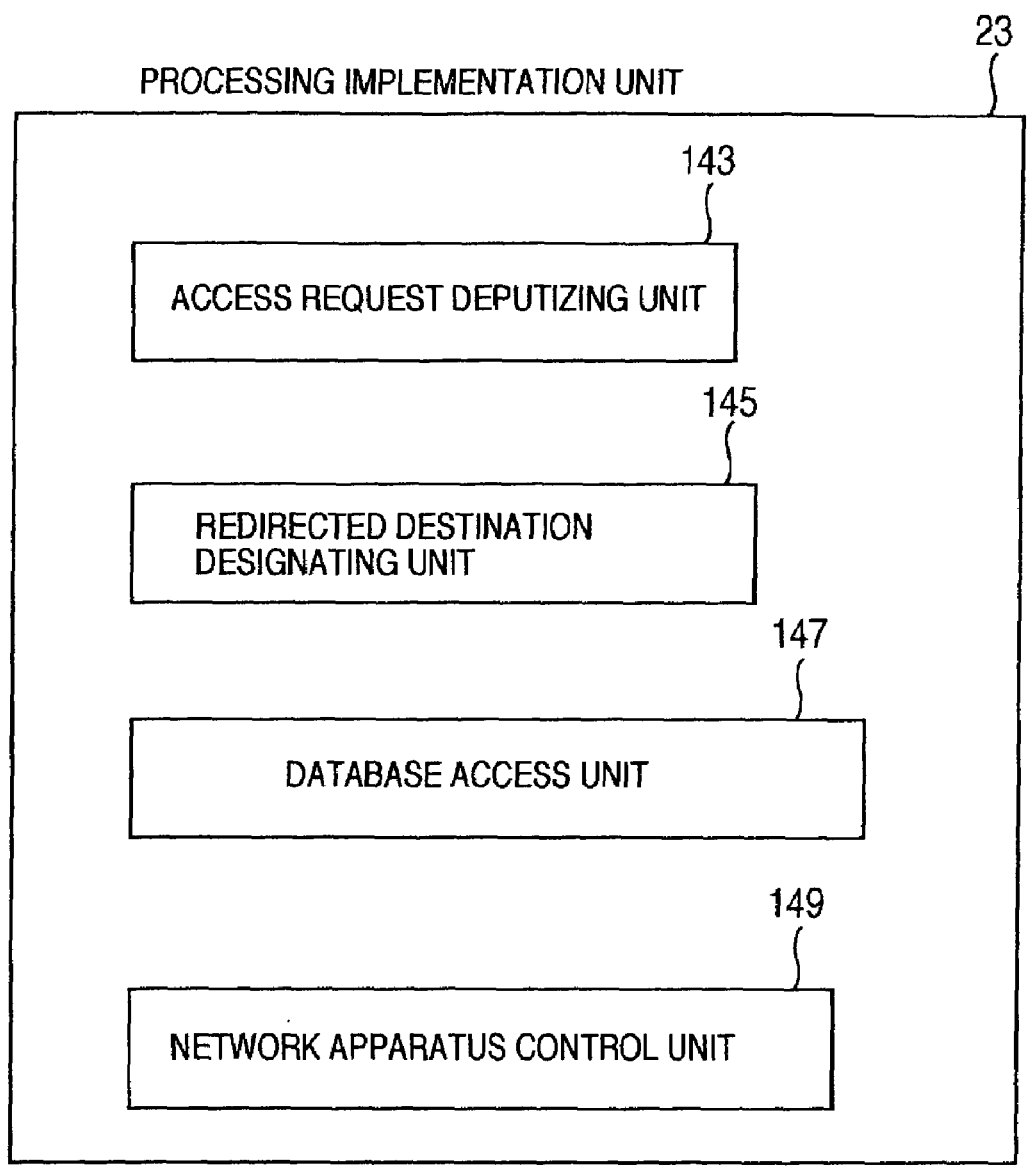
FIG. 22 is a diagram illustrating a configuration of the processing implementation unit in the communication apparatus of the embodiment.

The processing implementation unit 23 includes, as shown in FIG. 22, the access request deputizing unit 143, the redirected destination designating unit 145, the database access unit 147 and the network apparatus control unit 149. These units are stored as programs in the memory unit in the communication apparatus 11 and are combined to be implemented in accordance with the service contents to be realized.

(Redirected Destination Designating Unit)

Figure 10:
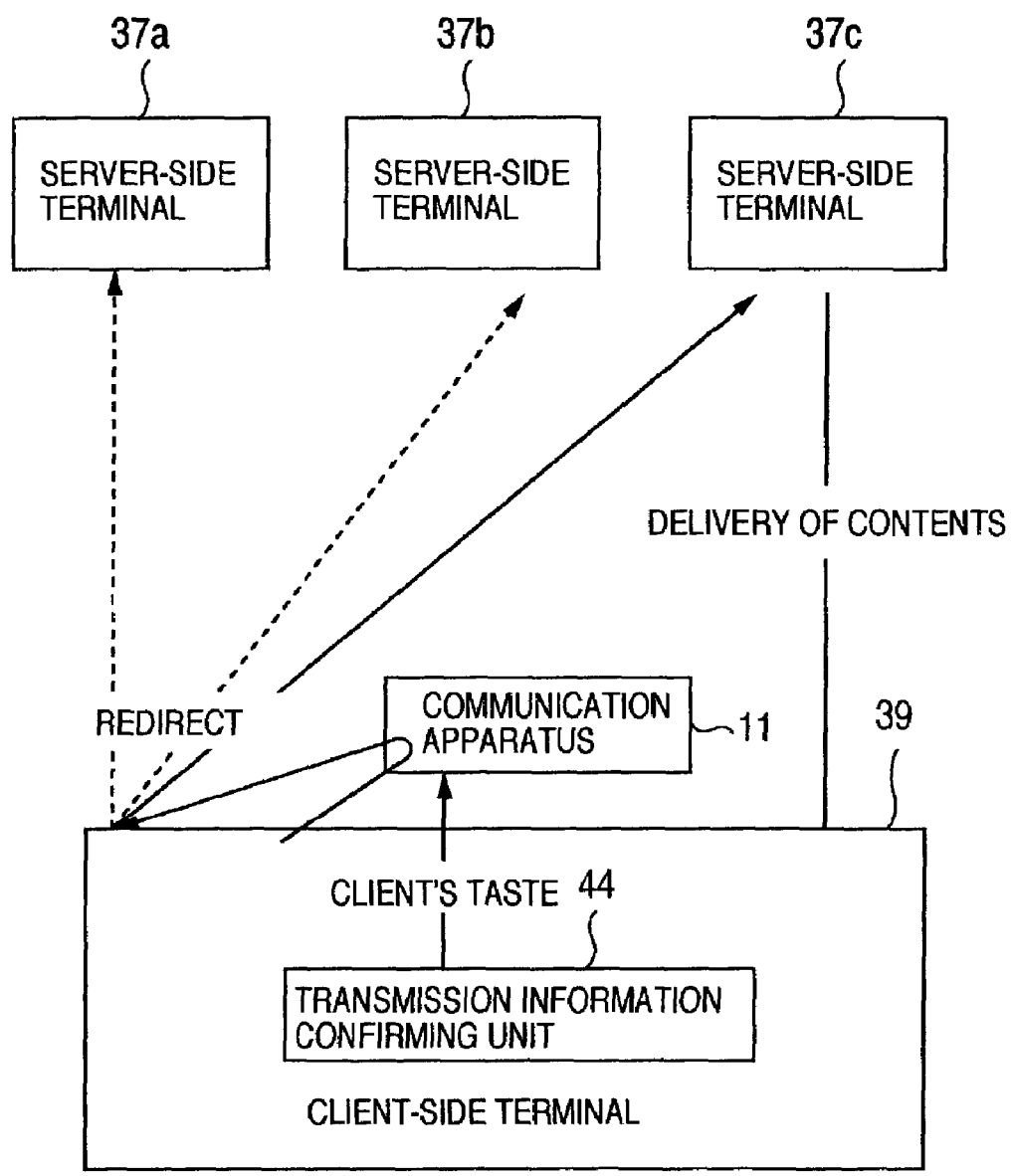
FIG. 10 is a diagram illustrating a configuration for making redirection to an optimum site and HTTP request with parameter on the basis of information transmitted in the communication apparatus of the embodiment.

FIG. 10 is a diagram for explaining realization of WWW access distribution function by using the redirected destination designating unit 145 in the communication apparatus 11 on the basis of information such as client's taste and client's priority information described in the character-string information transmitted from the client-side terminal 39 to the communication apparatus 11.

In FIG. 10, it is considered the case where information from the client-side terminal 39 having the high priority is transmitted to the communication apparatus 11 when WWW service using a plurality of mirror servers or cache servers shown by 37a, 37b and 37c is provided.

In this case, the communication apparatus 11 previously makes measurement concerning the performance of server such as time required for a response from the plurality of mirror servers or cache servers and stores it in the memory unit of the communication apparatus 11. Next, the communication apparatus 11 makes distribution to an optimum mirror server or cache server with reference to information such as the client's attribute of the information transmitted from the client-side terminal 39 and information such as the measured result concerning the server performance stored in the memory unit of the communication apparatus 11. The outline of operation is as follows: (1) Information such as the client attribute and a request to desired contents are transmitted from the client-side terminal 39 to the communication apparatus 11. (2) The communication apparatus 11 refers to the information stored in the memory unit of the communication apparatus 11 and the information received from the client and decides the redirected destination server on the basis of the processing method definition 25 preserved in the communication apparatus 11. (3) The communication apparatus 11 transmits an address of the redirected destination in the format of URL (Uniform Resource Locator) or the like to the client-side terminal. (4) The client-side terminal 39 uses the redirected destination address received and accesses to the server-side terminal 37.

Similarly, the redirection may be made to the WWW server or the cache server holding the optimum contents on the basis of information indicative of the client's taste transmitted. Further, the communication apparatus 11 may produce the parameter corresponding to the information indicative of the client's taste and make the HTTP request to which the parameter is added.

Further, the communication apparatus 11 may make the HTTP request to the server-side terminal 37 and may perform relaying operation that the acquired contents are transferred to the client-side terminal 39 instead of transfer of the redirected destination address to the client-side terminal 39.

These functions can be utilized to perform the contents providing service in accordance with the customer's taste. At this time, the customer can utilize the transmission information confirming unit 44 described with reference to FIG. 4 and can confirm the information transmitted by the customer himself if necessary. Thus, the system respecting customer's consciousness for privacy protection can be constructed.

(Network Apparatus Control Unit)

Figure 11:
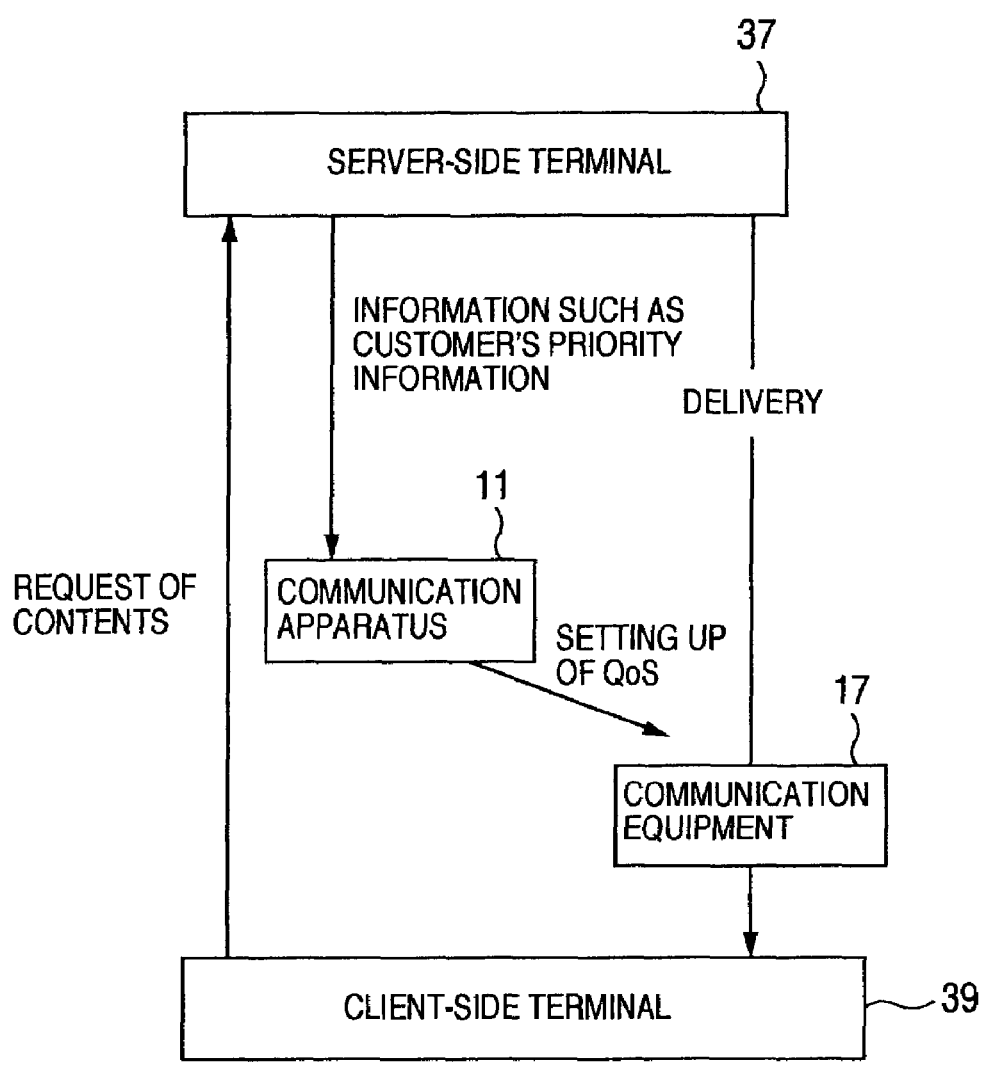
FIG. 11 is a diagram illustrating a configuration for making setting-up of QoS to the communication equipment in response to the command from the server-side terminal in the communication apparatus of the embodiment.

The network apparatus control unit 149 performs operation as follows:

As shown in FIG. 11, the communication apparatus 11 transmits the document that defines the service contents (customer priority and the like) before delivery of contents or together with delivery of contents with respect to transmission of information from the server-side terminal 37 to the client-side terminal 39. The definition document makes it possible to set up the communication equipment such as a router disposed in a contents delivery path and implement flow control, queue control and transmission control such as securement of the communication band assuring the quality of contents or securement of the communication route and the communication band corresponding to the customer priority.

Figure 12:
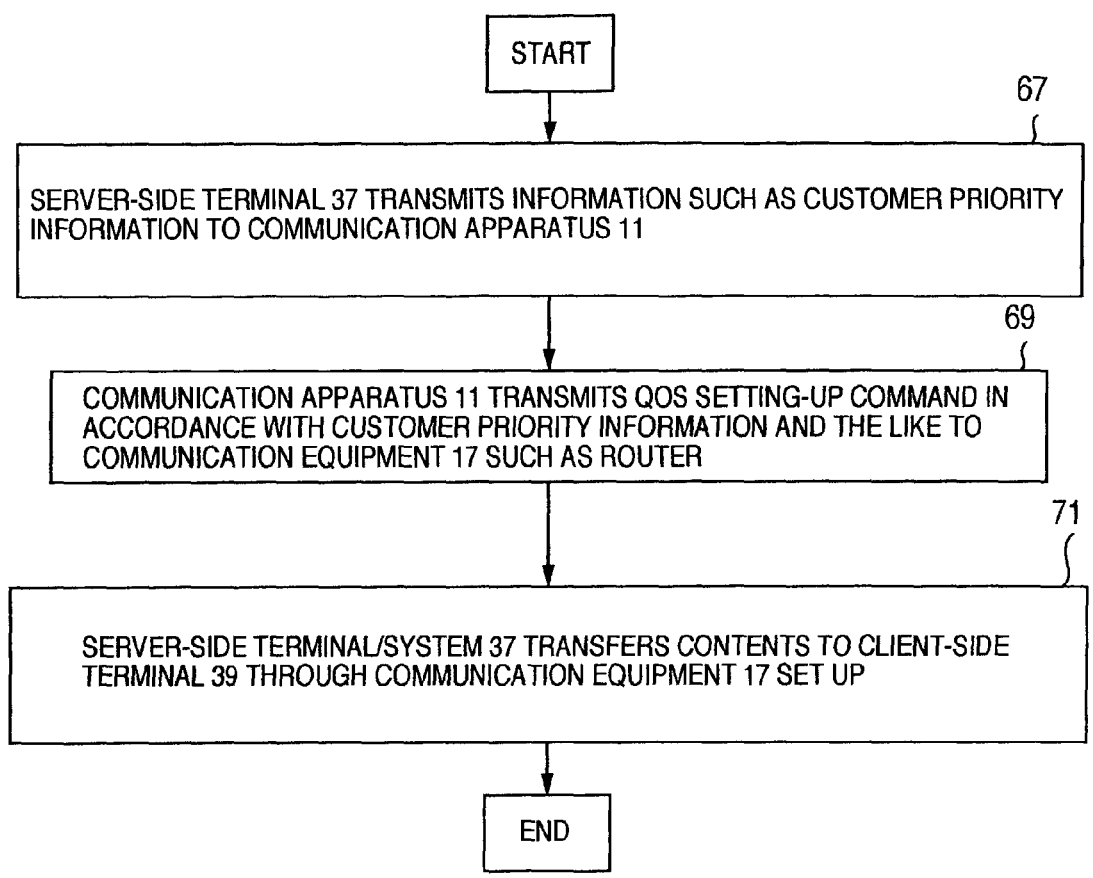
FIG. 12 is a flow chart showing operation in the configuration of FIG. 11.

FIG. 12 is a flow chart showing operation of the network equipment control unit.

First, the server-side terminal 37 transmits the customer priority information to the communication apparatus 11 (67).

The communication apparatus 11 transmits the QoS setting-up command in accordance with the customer priority information and the like to the communication equipment 17 such as a router (69).

Next, the server-side terminal 37 transfers the contents to the client-side terminal through the set-up communication equipment 17 (71) and the customer receives the contents and views and listens to the contents.

The setting-up of QoS means the processing in which the communication apparatus 11 decides the delivery priority on the basis of information indicating the customer priority and sets up the delivery priority to the IP packet when the communication equipment 17 such as a router can control the order of relay processing in accordance with the delivery priority of the IP packet in the system configuration shown in FIG. 11, for example.

As the technique for realizing the priority delivery, there is known the Diffserv (Differentiated Services) technique described in, for example, article 3: "An Architecture for Differentiated Services", by Blake, S., Black, D., Carlson, M., Davies, E., Wang, Z. and W. Weiss, RFC 2475, December 1998. In this technique, the communication apparatus 11 sets up the decided delivery priority to the ToS (Type of Service) field (for designating the delivery priority information and the like) of the header portion of the IP packet constituting a delivery unit of data. The router dealing with the Diffserv technique delivers the IP packets in accordance with the priority corresponding to the delivery priority information set up to the ToS field.

The communication apparatus 11 has the command for setting up the communication equipment or the processing method definition in which the parameters are mapped in correspondence manner to the customer priority information or information such as kind and quality of contents.

Figure 13:
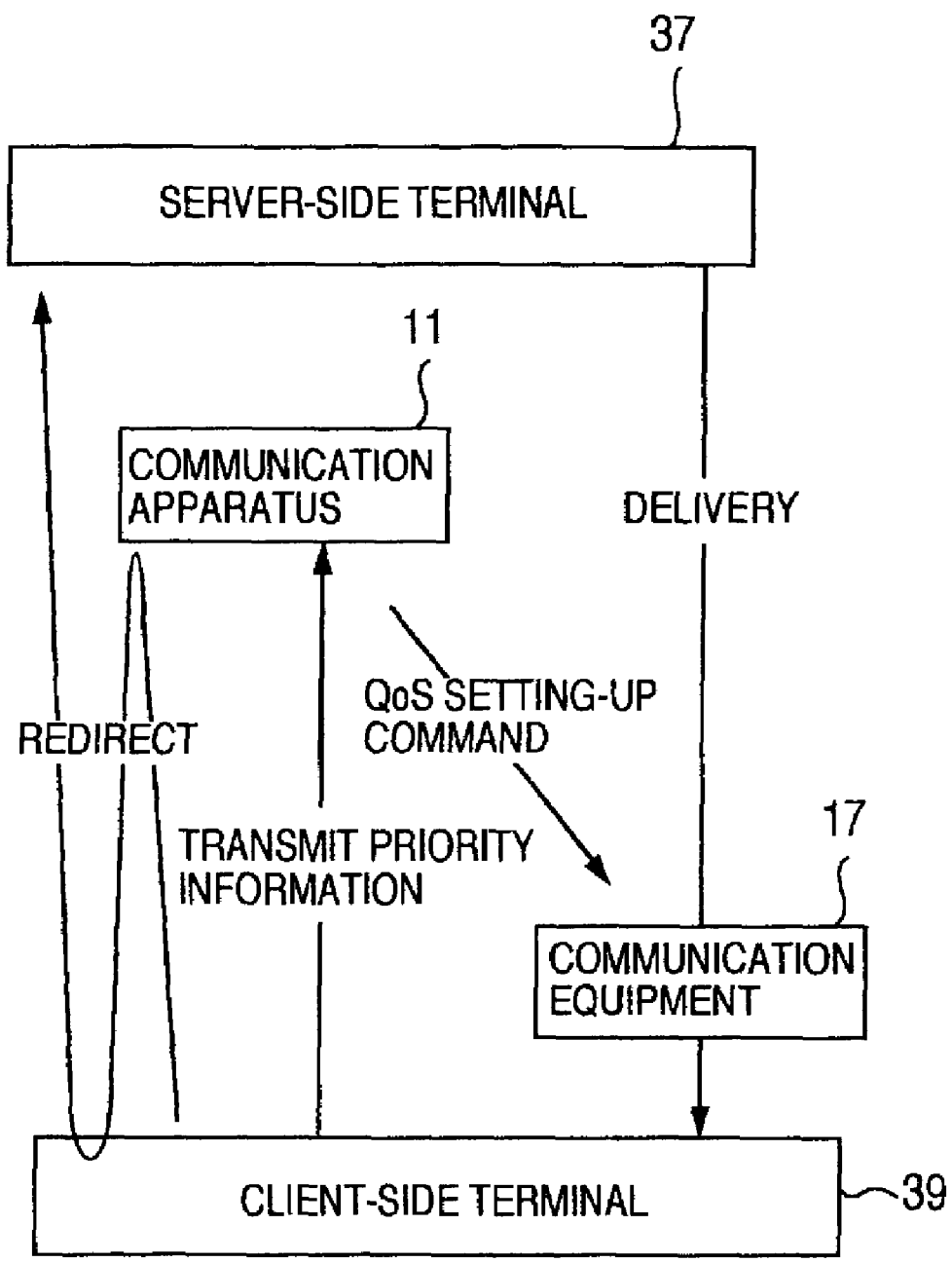
FIG. 13 is a diagram illustrating a configuration for making setting-up of QoS to the communication equipment in response to the command from the client-side terminal in the communication apparatus of the embodiment.

Further, as shown in FIG. 13, the client-side communication terminal 39 may transmit the customer priority information to the communication apparatus 11 and the communication apparatus 11 may perform flow control, queue control and transmission control such as securement of the communication band and the communication route in accordance with the received customer priority information.

Figure 14:
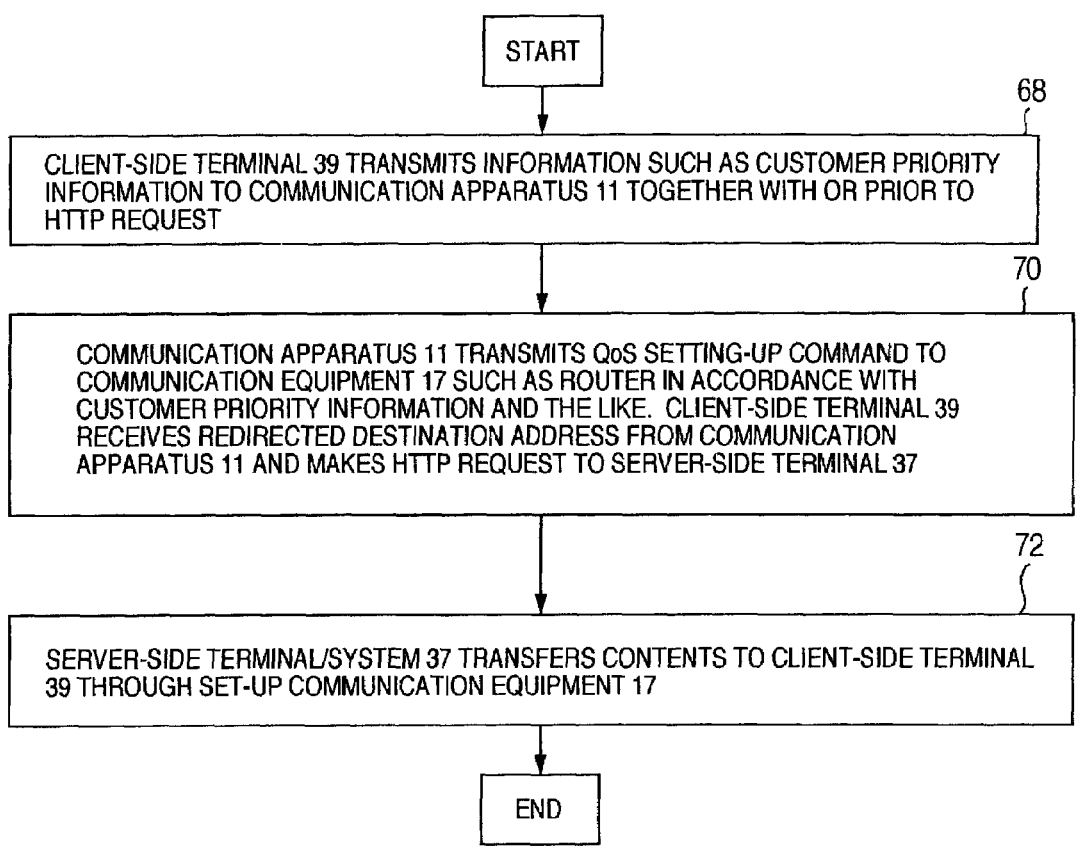
FIG. 14 is a flow chart showing operation in the configuration of FIG. 13.

FIG. 14 is a flow chart showing operation of the network apparatus control unit in the configuration of FIG. 13.

First, the client-side terminal 39 transmits the customer priority information to the communication apparatus 11 together with or prior to the HTTP request (68).

The communication apparatus 11 transmits the QoS setting-up command to the communication equipment 17 such as router in accordance with the customer priority information and the like. Further, the client-side terminal 39 receives the redirected destination address from the communication apparatus 11 and makes the HTTP request to the server-side terminal 37 (70).

The server-side terminal 37 transfers the contents to the client-side terminal 39 through the set-up communication equipment 17 (72) and the client views and listens to the contents.

(Database Access Unit)

The database accessed by the database access unit 147 stores information required when each processing implementation unit of the communication apparatus 11 performs operation in accordance with the service definition described in the received character-string information. The processing implementation unit represents the access request deputizing unit 143, the redirected destination designating unit 145, the database access unit 147 and the network apparatus control unit 149. Definite example of the information contains (A) individual information required to register accounting information, (B) customer priority information for ensuring the band in accordance with the priority, and (C) measured results such as response performance of a plurality of servers required when the redirected destination designating unit 145 or the like is used. Further, the database may be used as an extended area for storing the same kind of information as the information stored in the processing method definition memory unit 25.

Figure 15:
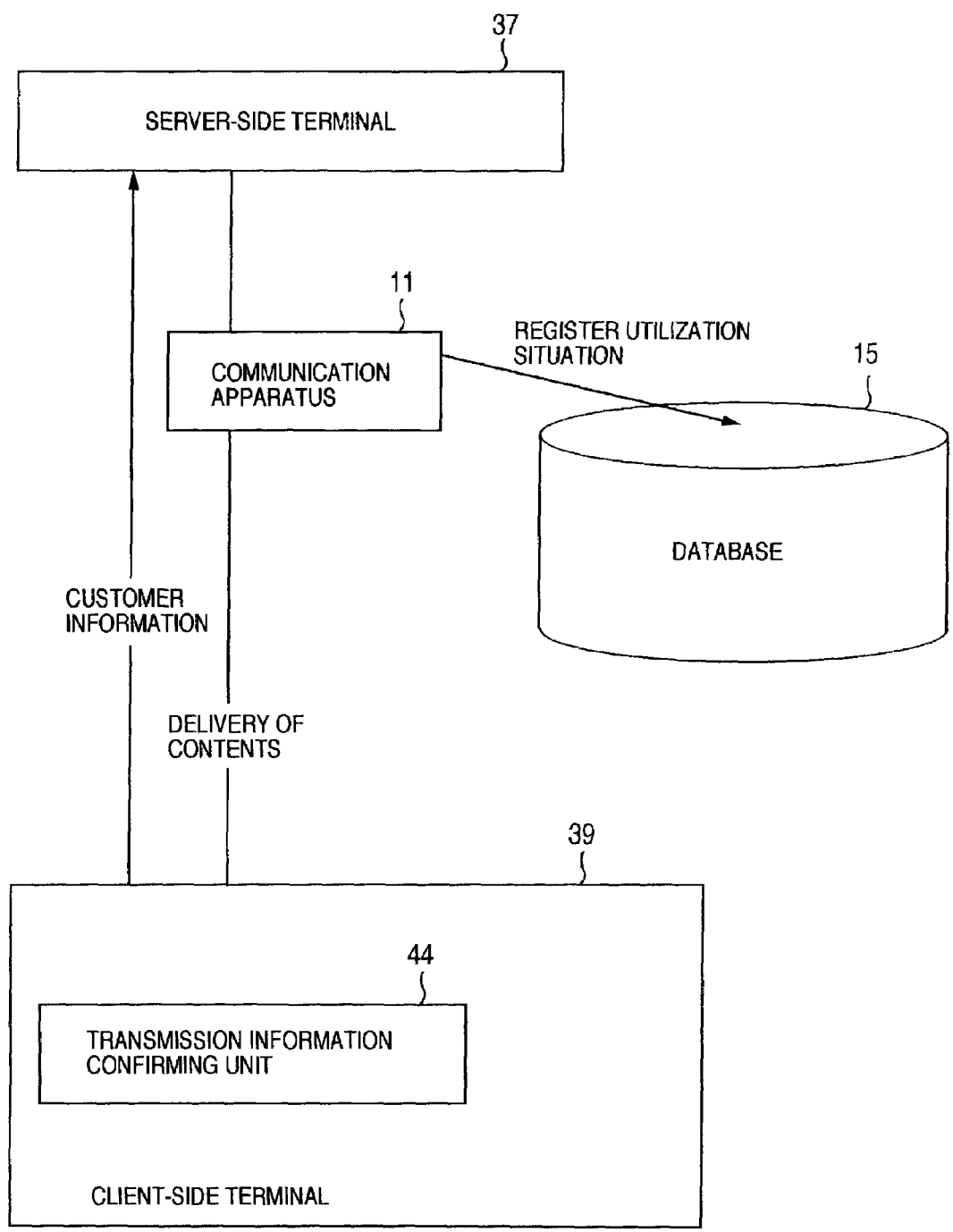
FIG. 15 is a diagram illustrating a configuration for making database operation when the database processing command is received in the communication apparatus of the embodiment.

The function which interprets the document describing the service contents and access to the database can be applied as follows:

In other words, as shown in FIG. 15, in the case where the client-side communication terminal 39 refers to information of the server-side communication terminal 37, the client-side communication terminal 39 can transmit to the server-side communication terminal 37 the document describing customer's information such as contracted service contents, account ID and utilization history to thereby automatically register the accounting information in the database 15 for accounting possessed by the communication enterpriser such as internet service providers.

Figure 16:
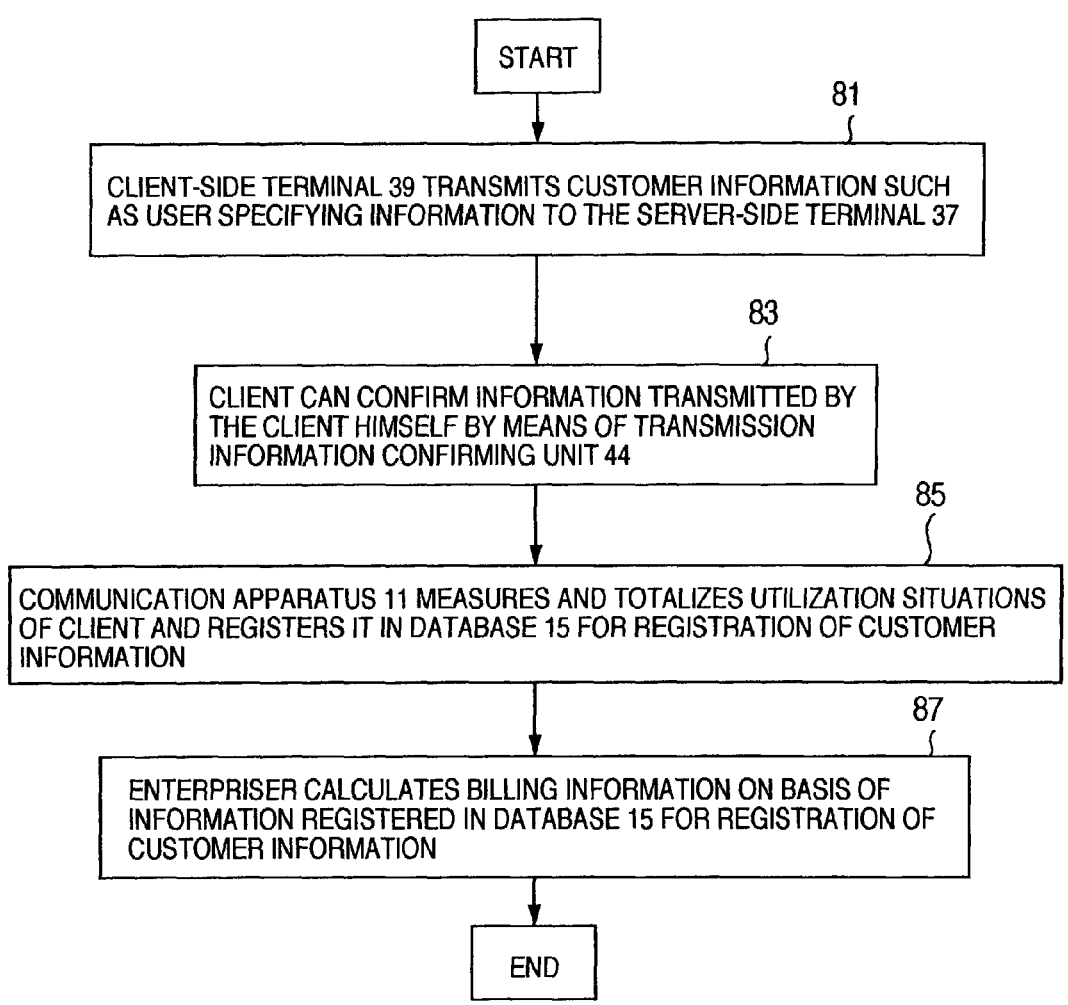
FIG. 16 is a flow chart showing operation in the configuration of FIG. 15.

FIG. 16 is a flow chart showing operation of the apparatuses in the configuration of FIG. 15. First, the client-side terminal 39 transmits the customer information such as information for specifying the user to the server-side terminal 37 (81).

At this time, the client can confirm the information transmitted by the client himself by means of the transmission information confirming unit 44 (83).

Next, the communication apparatus 11 measures and totalizes utilization history of the client and registers it in the database 15 for registration of customer information (85).

The enterprise calculates accounting information of the client on the basis of the information registered in the database 15 for registration of customer information (87).

By utilizing this method, (1) the customer can keep his own individual information on the side of the customer himself and transmit it if necessary to thereby eliminate the necessity of manually inputting the user information many times.

Further, (2) the provision of the transmission information confirming unit 81 allows the customer to confirm his own transmission information. Moreover, it can be prevented that excessive individual information unnecessary to receive the service is transmitted to many and unspecified servers and the like to thereby further ensure the security.

Further, this function may be utilized to store the location of the contents stored in the memory units such as storages distributed dispersedly and the summary information of the contents in the database 15. The communication apparatus 11 can refer to the information to provide the services such as storage service and contents collection service in cooperation with the processing implementation unit 23 such as the redirected destination designating unit 145.

As described above, thoughtful services are provided easily in cooperation with the processing implementation unit 23 other than the database access unit 147.

(Examples of Service)

As examples of system configurations utilizing the communication apparatus 11, "positional information providing service of a communication terminal" and "pictures and/or videos delivery service" are described below.

Figure 17:
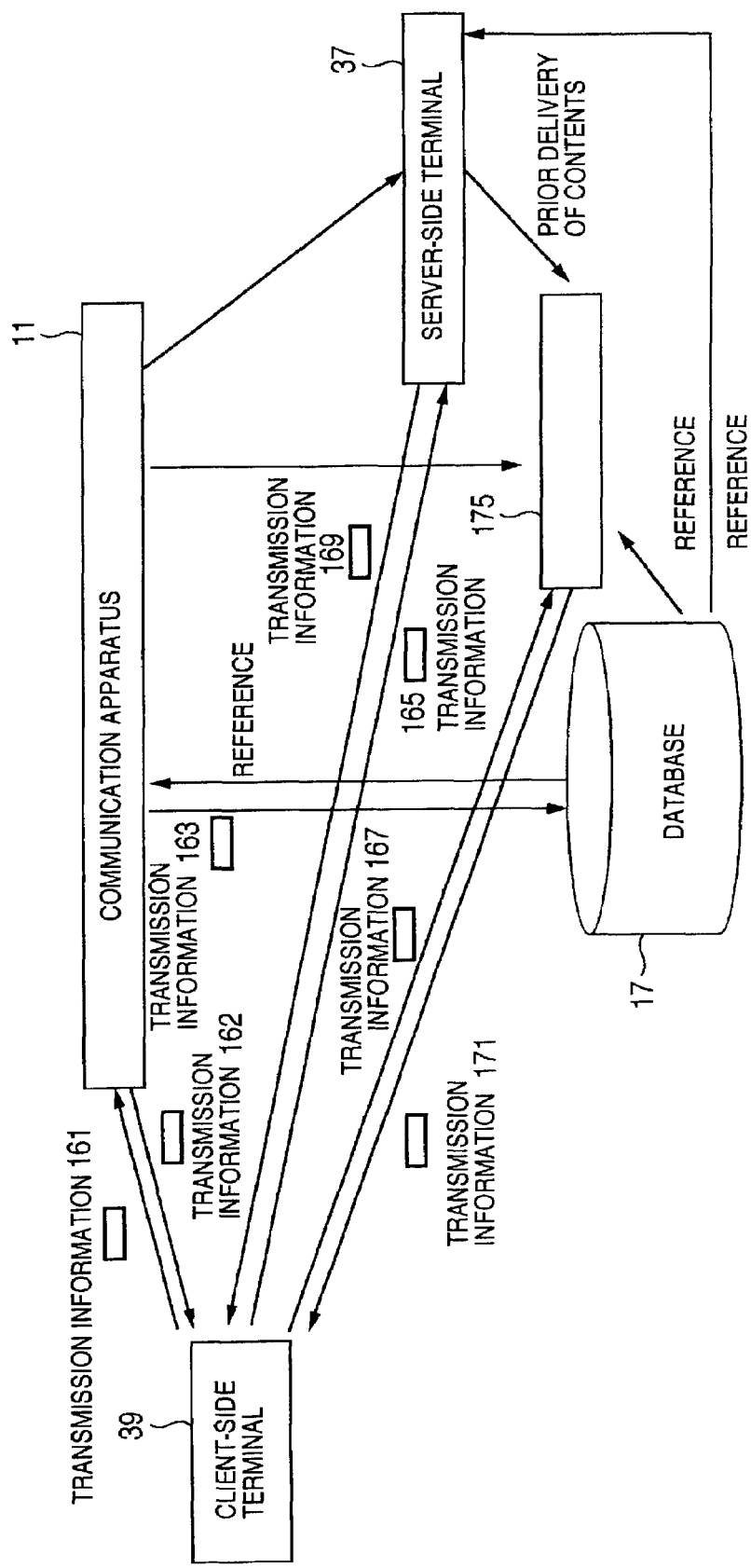
FIG. 17 is a diagram illustrating an example of a configuration utilizing the communication apparatus of the embodiment for realizing the positional information providing service.

FIG. 17 schematically illustrates an example of a system utilizing the communication apparatus 11 of the embodiment for realizing the positional information providing service. As an example of the client-side terminal 39, there are a portable terminal and an on-vehicle terminal. Further, a plurality of server-side terminals 37 and a plurality of cache servers 175 may be provided. In addition, the communication apparatus 11 and the database 17 are provided.

Figure 18:
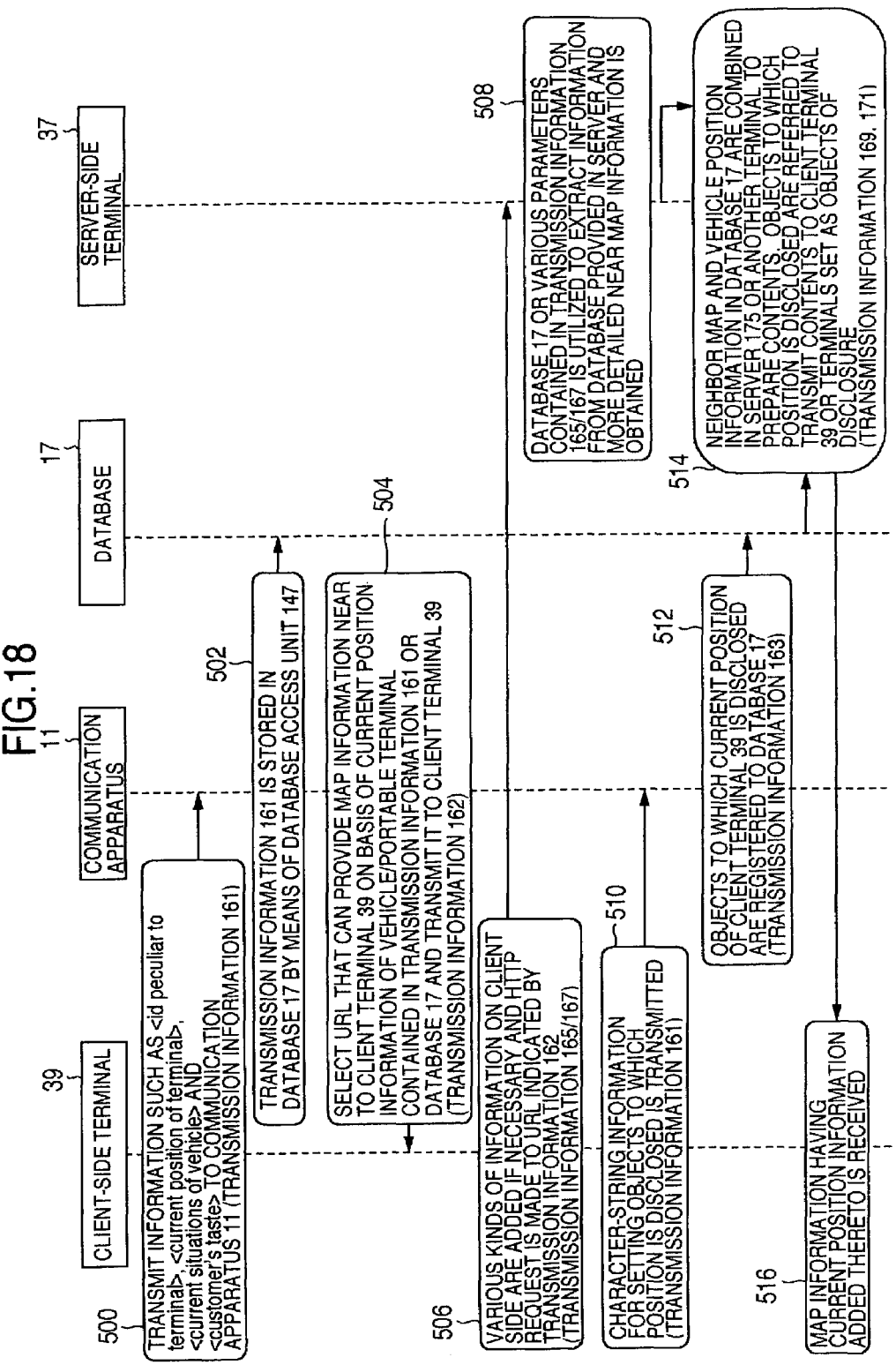
FIG. 18 is a sequence diagram showing an example of operation in the configuration of FIG. 17.

FIG. 18 shows an example of a sequence chart showing operation of the system utilizing the communication apparatus 11 of the embodiment for realizing the positional information providing service.

[Information Registration Utilizing Database Access Unit]

In the client-side terminal 39 such as on-vehicle communication terminal and portable communication terminal, information such as peculiar ID 210, current position 208 and current situations of vehicle (speed, distance between vehicles and the like) is used to prepare a document by means of the tag type language such as XML and is transmitted to the communication apparatus 11 as transmission information 161 (500).

The communication apparatus 11 calls out the relevant processing implementation unit 23 on the basis of the processing method definition stored in the processing method definition memory unit 25 of the communication apparatus 11 to thereby register information such as the current position of the on-vehicle communication terminal or the portable communication terminal, the ID peculiar to the communication terminal and the current situations of the vehicle to which the communication terminal belongs in the database 17 for registration of positional information of the communication terminal (502).

[Distribution of WWW Accesses]

The communication apparatus 11 notifies the client-side terminal 39 of a site (cache server 175 or server-side terminal 37) which can obtain "map information near to the current position of the client-side terminal 39" as the transmission information 162 with reference to the transmission information 161 from the client-side terminal 39 or the current position information of the client-side terminal stored in the database 17 for registration of positional information of the communication terminal (504).

The client-side terminal 39 redirects the contents delivery request on the basis of the transmission information 162. That is, the contents delivery request is transmitted to the cache server 175 or the server-side terminal 37 on the basis of the transmission information 165, 167 (506).

[Database Access Unit and Disclosure of Position]

Similarly to steps 500 and 502, objects to which the current position of the on-vehicle communication terminal or the portable communication terminal is allowed to be disclosed are set up in the memory unit such as the database 17 for registration of positional information of the communication terminal on the basis of the transmission information 161, 163 (510, 512).

When the communication apparatus 11 receives from a certain client-side terminal 39 the disclosure request of the positional information of another client-side terminal 39, the communication apparatus 11 judges whether disclosure of the positional information is allowed or not with reference to information of the set-up objects to which the position is allowed to be disclosed. This method can be utilized to exchange positional information between a plurality of on-vehicle communication terminals and portable communication terminals.

[Extraction of Information by Parameter]

The cache server 175 and the server-side terminal 37 perform processing such as query to the database provided in its own apparatus if necessary and prepare contents to be transmitted to the client-side communication terminal 39.

In the preparation, information desired by the client is extracted from the database provided in the cache serve 175 and the server-side terminal 37.

More particularly, the information desired by the client is extracted with reference to information such as the parameter (current position of on-vehicle communication terminal or portable communication terminal and the like) contained in the transmission information 165, 167 or the current position of the communication terminal existing in another database. The information to be extracted contains, for example, customer's taste or genre to which facilities that the customer wants to investigate belong (508).

[Combination and Presentation]

The cache server 175 and the server-side terminal 37 use the processing unit provided in their respective apparatus or another communication terminal to combine the map information obtained as above and the current position information of the on-vehicle communication terminal or the portable communication terminal so that the contents are prepared (514).

The contents are presented to the client-side communication terminal 39 or objects of disclosure set up by the customer (516).

[Totalization of Vehicle Situations and Presentation of Traffic Information]

Further, information of vehicle situations such as speed and distance between vehicles from the client-side terminals 39 in a plurality of vehicles may be totalized and stored in the database 17 to prepare road traffic information and the road traffic information to the user.

Figure 19:
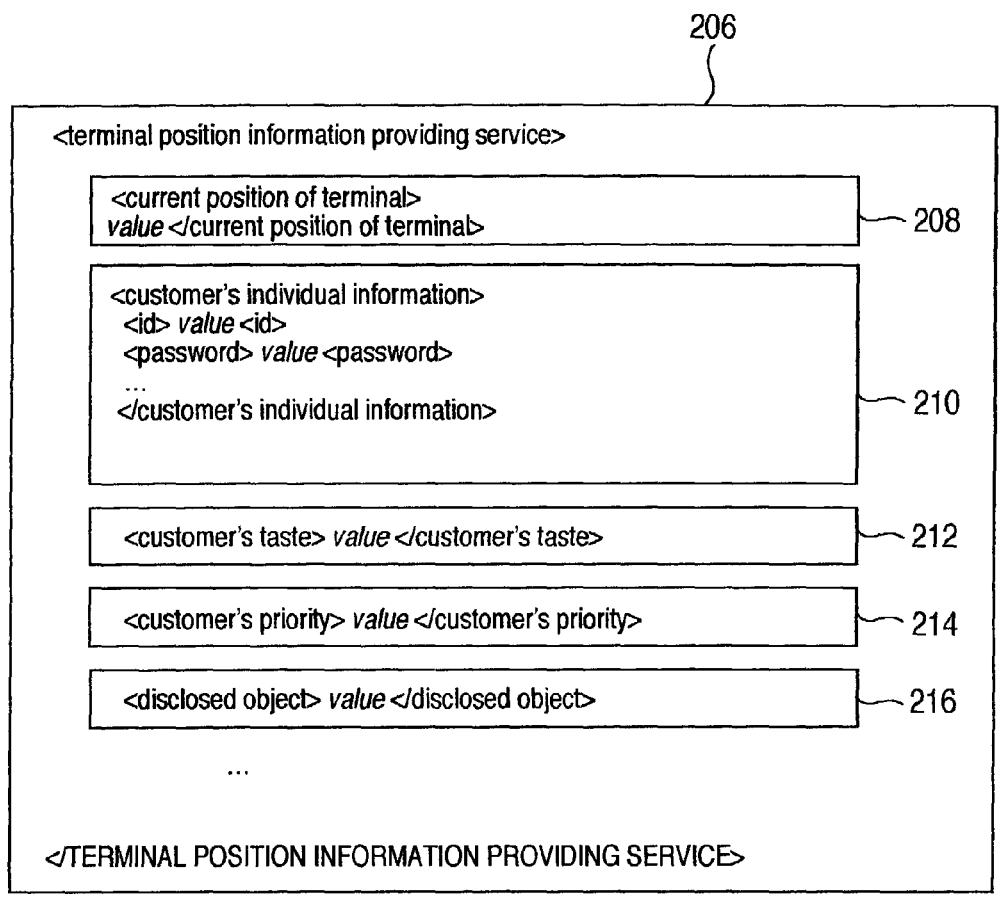
FIG. 19 is a diagram showing an example of the character-string information transmitted to the communication apparatus of the embodiment from the communication terminal for realizing the terminal position information service.

FIG. 19 shows an example of the character-string information transmitted to the communication apparatus 11 from the client-side terminal 39 in the positional information providing service.

For example, the character string of "terminal position information providing service" described in the first line and the last line in 206 of FIG. 19 represents the service name. Numeral 208 represents the current position of the client-side terminal obtained by using the processing unit such as GPS. Numeral 210 represent the individual information such as the customer's ID and password preserved in the terminal. Numeral 212 represents the customer's taste information for obtaining information desired by the customer from the server-side terminal 37. Numeral 214 represents the customer's priority information used when communication performance is set up in accordance with the customer's priority by using the network apparatus control unit 149. Numeral 216 represents information designating objects to which the customer discloses the current location of the client-side terminal 39 possessed by the customer himself.

Figure 20:
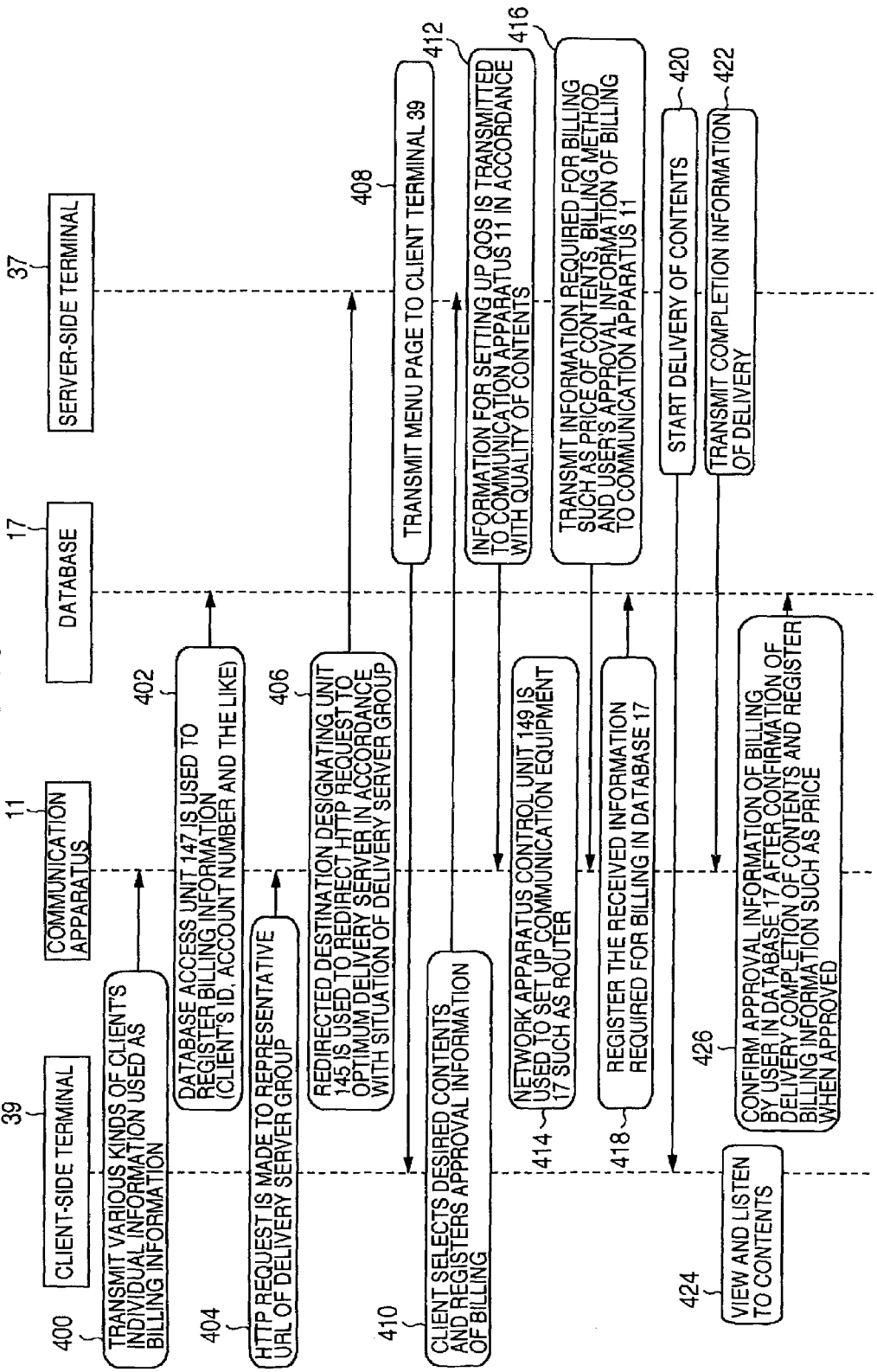
FIG. 20 is a sequence diagram showing an example of operation for realizing the picture delivery service in the system utilizing the communication apparatus of the embodiment.

FIG. 20 shows an example of a sequence chart showing operation of the system utilizing the communication apparatus of the embodiment for realizing the pictures and/or videos delivery service.

[Transmission of Individual Information for Billing]

The client terminal 39 transmits the accounting information such as client's ID and account number to the communication apparatus 11 (400).

The input information interpreting unit 27 of the communication apparatus 11 recognizes the billing information transmitted and stores it in the database 17 for registration of billing information by means of the database access unit.

[Dispersion of Load and Server According to Contents]

The client terminal 39 makes HTTP request to a representative URL of the delivery server group (404). The communication apparatus 11 receives the request and redirects it to an optimum server-side terminal 37 by means of the redirected destination designating unit 145. At this time, the redirection may be made in consideration of the customer's priority information transmitted from the client-side terminal 39 or the load situation of the delivery server group (406).

The server-side terminal 37 presents a menu page indicating a list of viewable contents to the client-side terminal 39 (408).

The client-side terminal 39 selects desired contents from the presented page in response to the user's indication and gains approval of billing. The approval information of billing is transmitted to the server-side terminal 37 and preserved (410).

[Setting-Up of QoS]

The server-side terminal 37 transmits information for setting up QoS to the communication apparatus 11 in accordance with the quality of the contents selected by the client (412).

The input information interpreting unit 27 of the communication apparatus 11 sets up the communication equipment 17 such as router in accordance with the transmitted QoS setting-up information by means of the network apparatus control unit 149 (414).

[Registration of Accounting Information]

The server-side terminal 37 transmits information required for billing such as price of contents, billing method and user's approval information of billing to the communication apparatus 11 (416).

The input information interpreting unit 27 of the communication apparatus 11 registers the information required for billing in the database 17 in accordance with the received accounting information. The information required for billing contains the approval information of billing, the billing method, the price of contents and the like (418).

[Confirmation of Completion of Delivery]

The server-side terminal 37 starts delivery of contents to the client-side terminal 39 (420).

When the delivery of contents is completed, the server-side terminal 37 transmits completion information of the delivery to the communication apparatus 11 (422).

The input information interpreting unit 27 of the communication apparatus 11 starts the accounting procedure when the completion information of delivery is received from the server-side terminal 37. The client-side terminal 39 may transmit the completion information of delivery to the communication apparatus 11.

The communication apparatus 11 examines the approval information of billing in the database 17 and stores the billing information in the database 17 when approved (426).

The enterprise and the like who perform billing collect billing information stored in the database 17 and perform the billing procedure to the users.

When the above-mentioned services are provided, the processing units such as the access request deputizing unit 143, the redirected destination designating unit 145, the database access unit 147 and the network apparatus control unit 149 can be combined in accordance with the service contents to thereby set up thoughtful service contents.

With modification of the service contents, when it is necessary to update and add the processing method definition preserved in the communication apparatus 11 of the embodiment, the plurality of communication apparatuses 11 receive the designation therefor from the processing unit delivery servers (33, 34, 35, 36) as described above to thereby cope with it.

This function can be utilized to construct the system which can cope with modification of specifications for common data format definition 1 for exchange of information and modification of service contents promptly.

The communication apparatus of the embodiments can realize various services by combining the plurality of processing units such as the access request deputizing unit 143, the redirected destination designating unit 145, the database access unit 147 and the network apparatus control unit 149. Further, since the plurality of processing implementation units and the processing method definition are provided in one apparatus, the service contents can be modified efficiently.

The communication apparatus of the embodiments can be utilized to easily add the function for setting up the service level in the communication performance utilizing the billing system and the QoS setting-up function requiring the database processing newly when it is necessary to modify the video on demand service, the streaming delivery service and the positional information providing service.

Further, the communication apparatus of the embodiments can modify the various processing units and the processing method definition to thereby provide the system having different service contents while utilizing the existing facilities as they are.

According to the present invention, detailed service design can be attained in communication between terminals. Further, there can be constructed the communication system which can cope with modification of the service contents promptly.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. At least one communication apparatus connected to any of server-side communication terminals and client-side communication terminals or a communication line in a communication system in which said server-side communication terminals and said client-side communication terminals are connected through the communication line, comprising:

an input information interpreting unit, a processing implementation unit and a processing method definition memory unit;

said input information interpreting unit referring to a processing method defined in said processing method definition memory unit and interpreting character-string information received from said server-side communication terminal, said client-side communication terminal or another communication apparatus;

said processing implementation unit processing said character-string information in accordance with the processing method defined in said processing method definition memory unit, and transmitting and receiving control information or management information from another communication equipment or a communication terminal in said communication system, wherein said processing implementation unit includes a World Wide Web (WWW) access distribution function for distributing accesses to the server-side communication terminals, wherein said processing implementation unit is arranged to perform setting-up said communication apparatus relating to communication performance, processing of a database for registering or referring to user information, and distributing accesses from the client-side communication terminals to the server-side communication terminals.

2. A communication apparatus according to claim 1, wherein said input information interpreting unit utilizes a tag-type language describing information and attributes of the information as said character-string information, and said processing implementation unit performs processing in accordance with the information and the attributes of the information contained in said character-string information.

3. A communication apparatus according to claim 2, comprising a processing unit that prepares said character-string information, and a processing unit that transmits said prepared character-string information through said communication line to another communication terminal or another communication apparatus.

4. A communication apparatus according to claim 2, comprising
a processing unit that allows a user of said communication apparatus to confirm contents of said character-string information when said character-string information is transmitted.

5. A communication apparatus according to claim 1, wherein
said processing implementation unit updates and/or adds said input information interpreting unit, said processing implementation unit and memory contents of said processing method definition memory unit in accordance with said character-string information received through said communication line.

6. A communication apparatus according to claim 5, wherein
said processing implementation unit performs said updating and/or adding processing in accordance with said received character-string information without stopping processing by said unit to be processed.

7. A communication apparatus according to claim 1, wherein according to the WWW access distribution function, information is transmitted from a client-side terminal to the communication apparatus, and after referring to other information stored in the communication apparatus, the communication apparatus determines a redirected destination server and transmits the address of the redirected destination server to the client-side terminal.

8. A communication apparatus according to claim 7, wherein the information includes client attribute information and a request for desired contents.

9. A communication system in which server-side communication terminals, client-side communication terminals and at least one communication apparatus are connected through a communication line, wherein,
said communication apparatus comprises an input information interpreting unit, a processing implementation unit and a processing method definition memory unit, and
said input information interpreting unit refers to a processing method defined in said processing method definition memory unit and interprets character-string information received from said communication terminal or another communication apparatus,
said processing implementation unit processing said character-string information in accordance with the processing method defined in said processing method definition memory unit, and transmitting and receiving control information or management information from another communication equipment or a communication terminal in said communication system, wherein said processing implementation unit is arranged to perform
setting-up said communication apparatus relating to communication performance,
processing of a database for registering or referring to user information, and
distributing accesses from the client-side communication terminals to the server-side communication terminals, said client-side communication terminal including
a processing unit that prepares said character-string information, and
a processing unit that transmits said prepared character-string information to said communication apparatus.

10. A communication system according to claim 9, wherein
said client-side communication terminal includes a processing unit that prepares said character-string information containing information concerning a user of said client-side communication terminal, and
said communication apparatus includes a processing unit that notifies an address of said server-side communication terminal which is a destination to be accessed, to said client-side communication terminal on the basis of memory contents of said processing method definition memory unit and information contained in said character-string information,
said client-side communication terminal performing the access in accordance with said notified server-side communication terminal.

11. A communication system according to claim 9, wherein
said server-side communication terminal or said client-side communication terminal includes a processing unit that prepares said character-string information containing information concerning the user of said client-side communication terminal, and
said communication apparatus includes
a processing unit that prepares setting-up information to a communication equipment in said communication system on the basis of memory contents of said processing method definition memory unit and information contained in said character-string information, and
a processing unit that transmits said prepared setting-up information to said communication equipment.

12. A client-side communication terminal used in a communication system in which server-side communication terminals and at least one communication apparatus are connected through a communication line, wherein said communication apparatus includes processing implementation unit which is arranged to perform
setting-up said communication apparatus relating to communication performance,
processing of a database for registering or referring to user information, and distributing accesses from the client-side communication terminals to the server-side communication terminals, said client-side communication terminal comprising
a processing unit that prepares character-string information containing information concerning a user of said client-side communication terminal, and
a processing unit that transmits said prepared character-string information to said communication apparatus.

13. A client-side communication terminal according to claim 12, comprising
a processing unit that receives an address of said server-side communication terminal which is a destination to be accessed of said client-side communication terminal from said communication apparatus, and
a processing unit that performs the access in accordance with said server-side communication terminal notified.

* * * * *